(12) United States Patent
Merritt

(10) Patent No.: US 10,540,593 B1
(45) Date of Patent: *Jan. 21, 2020

(54) SYSTEM AND METHOD FOR MANAGING ROUTING OF CUSTOMER CALLS TO AGENTS

(71) Applicant: MASSACHUSETTS MUTUAL LIFE INSURANCE COMPANY, Springfield, MA (US)

(72) Inventor: Sears Merritt, Groton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,983

(22) Filed: Jun. 28, 2019

Related U.S. Application Data

(63) Continuation of application No. 16/267,331, filed on Feb. 4, 2019, now Pat. No. 10,346,750, which is a continuation of application No. 16/111,011, filed on Aug. 23, 2018, now Pat. No. 10,235,628.

(Continued)

(51) Int. Cl.
*H04M 3/51* (2006.01)
*H04M 3/523* (2006.01)
(Continued)

(52) U.S. Cl.
CPC ........... *G06N 5/022* (2013.01); *G06N 20/00* (2019.01); *G06Q 30/0201* (2013.01);
(Continued)

(58) Field of Classification Search
CPC ......... G06Q 30/0282; H04M 3/42059; H04M 3/42195; H04M 3/4365; H04M 3/5183; H04M 3/5231; H04M 3/5233
See application file for complete search history.

(56) References Cited

U.S. PATENT DOCUMENTS

| 5,519,773 A | 5/1996 | Dumas et al. |
| 6,185,558 B1 | 2/2001 | Bowman et al. |
| (Continued) | | |

FOREIGN PATENT DOCUMENTS

| EP | 2109302 B1 | 9/2010 |
| WO | 2007112411 A2 | 10/2007 |
| WO | 2009065052 A1 | 5/2009 |

OTHER PUBLICATIONS

Sara Costa, "Call Flow—Talkdesk Support", <https://support.talkdesk.com/hc/en-us/articles/206196766-Call-Flow>, Jan. 18, 2018, 6 pages.
(Continued)

*Primary Examiner* — Harry S Hong
(74) *Attorney, Agent, or Firm* — Eric L. Sophir; Dentons US LLP

(57) ABSTRACT

Upon receiving an inbound call, a call management system retrieves from a customer database enterprise customer data associated with an identified customer. The customer database tracks prospects, leads, new business and purchasers of an enterprise. Enterprise customer data may include customer event data, activity event data and attributions data. The system retrieves customer demographic data associated with the identified customer. A group of agents is selected from a plurality of groups of agents based on retrieved enterprise customer data. A predictive model determines a value prediction signal for the identified customer, then classifies the identified customer into a first value group or a second value group. The system routes a customer call classified in the first value group to a first queue position, and routes a customer call classified in the second value group to a second queue position. for connection to an agent from the selected group of agents.

20 Claims, 9 Drawing Sheets

Related U.S. Application Data

(60) Provisional application No. 62/551,690, filed on Aug. 29, 2017, provisional application No. 62/648,325, filed on Mar. 26, 2018, provisional application No. 62/648,330, filed on Mar. 26, 2018, provisional application No. 62/687,130, filed on Jun. 19, 2018.

(51) Int. Cl.
- *G06N 5/02* (2006.01)
- *H04M 3/436* (2006.01)
- *G06Q 30/02* (2012.01)
- *G06Q 30/06* (2012.01)
- *G06N 20/00* (2019.01)
- *H04M 3/42* (2006.01)

(52) U.S. Cl.
CPC ..... *G06Q 30/0282* (2013.01); *G06Q 30/0601* (2013.01); *H04M 3/4365* (2013.01); *H04M 3/5232* (2013.01); *H04M 3/5233* (2013.01); *H04M 3/5235* (2013.01); *H04M 3/42059* (2013.01); *H04M 3/42195* (2013.01); *H04M 3/5183* (2013.01); *H04M 3/5231* (2013.01); *H04M 2203/556* (2013.01); *H04M 2203/558* (2013.01)

(56) References Cited

U.S. PATENT DOCUMENTS

| | | |
|---|---|---|
| 6,236,977 B1 | 5/2001 | Verba et al. |
| 6,611,590 B1 | 8/2003 | Lu et al. |
| 6,862,574 B1 | 3/2005 | Srikant et al. |
| 6,879,683 B1 | 4/2005 | Fain et al. |
| 6,970,554 B1 | 11/2005 | Peterson et al. |
| 6,975,720 B1 | 12/2005 | Crook |
| 7,023,979 B1 | 4/2006 | Wu et al. |
| 7,035,811 B2 | 4/2006 | Gorenstein |
| 7,047,206 B1 | 5/2006 | Schultze |
| 7,228,284 B1 | 6/2007 | Vaillancourt et al. |
| 7,275,083 B1 | 9/2007 | Seibel et al. |
| 7,340,410 B1 | 3/2008 | Vaillancourt et al. |
| 7,580,870 B1 | 8/2009 | Chang |
| 8,355,934 B2 | 1/2013 | Virdhagriswaran |
| 8,515,736 B1 | 8/2013 | Duta |
| 8,548,843 B2 | 10/2013 | Folk et al. |
| 8,571,951 B2 | 10/2013 | Diana et al. |
| 8,577,014 B2 | 11/2013 | Brandt et al. |
| 8,582,750 B2 | 11/2013 | Lee et al. |
| 8,781,092 B2 | 7/2014 | Noble, Jr. |
| 8,805,734 B2 | 8/2014 | Diana et al. |
| 9,160,851 B2 | 10/2015 | Kugler et al. |
| 9,263,038 B2 | 2/2016 | Flaks et al. |
| 9,582,786 B2 | 2/2017 | Gubin et al. |
| 9,635,181 B1 | 4/2017 | McGann et al. |
| 9,680,996 B2 | 6/2017 | Kumar et al. |
| 9,911,131 B1 | 3/2018 | Ross et al. |
| 9,916,538 B2 | 3/2018 | Zadeh et al. |
| 10,229,370 B1* | 3/2019 | Merritt .................. G06N 5/022 |
| 10,235,628 B1* | 3/2019 | Merritt .................. G06N 5/022 |
| 10,257,357 B1* | 4/2019 | Merritt .................. G06N 5/022 |
| 10,346,750 B1* | 7/2019 | Merritt .................. G06N 5/022 |
| 2002/0035504 A1 | 3/2002 | Dver et al. |
| 2002/0082892 A1 | 6/2002 | Raffel et al. |
| 2002/0128885 A1 | 9/2002 | Evans |
| 2002/0138492 A1 | 9/2002 | Kil |
| 2004/0081311 A1 | 4/2004 | Thompson |
| 2004/0143473 A1 | 7/2004 | Tivey et al. |
| 2004/0143476 A1 | 7/2004 | Kapadia et al. |
| 2004/0143482 A1 | 7/2004 | Tivey et al. |
| 2004/0143483 A1 | 7/2004 | Tivey et al. |
| 2004/0143484 A1 | 7/2004 | Kapadia et al. |
| 2005/0125334 A1 | 6/2005 | Masella et al. |
| 2005/0195966 A1 | 9/2005 | Adar et al. |
| 2006/0041500 A1 | 2/2006 | Diana et al. |
| 2006/0155642 A1 | 7/2006 | Pettersen |
| 2006/0200360 A1 | 9/2006 | Razletovskiy |
| 2006/0229896 A1* | 10/2006 | Rosen .................. G06Q 10/10 705/321 |
| 2006/0265259 A1 | 11/2006 | Diana et al. |
| 2007/0027746 A1 | 2/2007 | Grabowich |
| 2007/0136164 A1 | 6/2007 | Roti et al. |
| 2007/0174108 A1 | 7/2007 | Monster |
| 2008/0120129 A1* | 5/2008 | Seubert .................. G06Q 10/06 705/35 |
| 2008/0162258 A1 | 7/2008 | Kala et al. |
| 2008/0184270 A1 | 7/2008 | Cole et al. |
| 2008/0201204 A1 | 8/2008 | Rose et al. |
| 2008/0201205 A1 | 8/2008 | Rose et al. |
| 2008/0294501 A1 | 11/2008 | Rennich |
| 2009/0190744 A1* | 7/2009 | Xie .................. H04M 3/5232 379/265.11 |
| 2009/0190745 A1* | 7/2009 | Xie .................. H04M 3/5232 379/265.11 |
| 2009/0190749 A1* | 7/2009 | Xie .................. H04M 3/5232 379/266.01 |
| 2009/0190750 A1* | 7/2009 | Xie .................. H04M 3/5232 379/266.03 |
| 2009/0232294 A1* | 9/2009 | Xie .................. H04M 3/42068 379/265.1 |
| 2009/0234710 A1 | 9/2009 | Belgaied Hassine et al. |
| 2010/0030578 A1 | 2/2010 | Siddique et al. |
| 2010/0054453 A1 | 3/2010 | Stewart |
| 2010/0114573 A1 | 5/2010 | Huang et al. |
| 2010/0306249 A1 | 12/2010 | Hill et al. |
| 2011/0153449 A1 | 6/2011 | Hite |
| 2011/0196776 A1 | 8/2011 | Rash et al. |
| 2011/0225082 A1 | 9/2011 | Diana et al. |
| 2011/0258016 A1 | 10/2011 | Barak et al. |
| 2011/0258067 A1 | 10/2011 | Rowell |
| 2011/0307257 A1 | 12/2011 | Pereg et al. |
| 2012/0053986 A1* | 3/2012 | Cardno .............. G06Q 30/0201 705/7.29 |
| 2012/0066065 A1 | 3/2012 | Switzer |
| 2012/0072232 A1 | 3/2012 | Frankham et al. |
| 2012/0166445 A1 | 6/2012 | Chakrabarti et al. |
| 2012/0203584 A1 | 8/2012 | Mishor et al. |
| 2013/0006916 A1 | 1/2013 | McBride et al. |
| 2013/0054480 A1 | 2/2013 | Ross et al. |
| 2013/0085805 A1 | 4/2013 | Kursar et al. |
| 2013/0215116 A1 | 8/2013 | Siddique et al. |
| 2013/0218634 A1 | 8/2013 | Hills et al. |
| 2013/0236002 A1 | 9/2013 | Jennings et al. |
| 2014/0058831 A1 | 2/2014 | Duva et al. |
| 2014/0149178 A1 | 5/2014 | Hedges |
| 2014/0149339 A1 | 5/2014 | Title et al. |
| 2014/0153703 A1 | 6/2014 | Desai et al. |
| 2014/0201126 A1 | 7/2014 | Zadeh et al. |
| 2014/0229406 A1 | 8/2014 | Puzis et al. |
| 2014/0279722 A1 | 9/2014 | Singh et al. |
| 2014/0289005 A1 | 9/2014 | Laing et al. |
| 2014/0324529 A1 | 10/2014 | Bliss |
| 2015/0046219 A1 | 2/2015 | Shavlik |
| 2015/0154524 A1 | 6/2015 | Borodow et al. |
| 2016/0071117 A1 | 3/2016 | Duncan |
| 2016/0203498 A1 | 7/2016 | Das et al. |
| 2016/0337795 A1 | 11/2016 | Nachman et al. |
| 2017/0124581 A1 | 5/2017 | Wilson et al. |
| 2017/0223190 A1 | 8/2017 | Mandel et al. |
| 2017/0243137 A1 | 8/2017 | Mandel et al. |

OTHER PUBLICATIONS

Raquel Florez-Lopez et al., "Marketing Segmentation Through Machine Learning Models", <https://pdfs.semanticscholar.org/ef05/502e936a94cafa0037c764bfb2212f385d97.pdf>, Social Science Computer Review, Oct. 8, 2008, 22 pages.

Sanford Gayle, "The Marriage of Market Basket Analysis to Predictive Modeling", <http://ai.stanford.edu/~ronnyk/WEBKDD2000/papers/gayle.pdf>, Published 2000, 6 pages.

(56) References Cited

OTHER PUBLICATIONS

Carlos Guestrin, "Unsupervised learning or Clustering—K-means Gaussian mixture models", <http://www.cs.cmu.edu/~guestrin/Class/10701-S07/Slides/clustering.pdf>, Apr. 4, 2007, 67 pages.

YongSeog Kim, "Customer Targeting: A Neural Network Approach Guided by Genetic Algorithms", <http://citeseerx.ist.psu.edu/viewdoc/download?doi=10.1.1.2.697&rep=rep1&type=pdf>, Feb. 1, 2005, 31 pages.

Dragomir Yankov et al., "Evaluation of Explore-Exploit Policies in Multi-result Ranking Systems", <https://arxiv.org/pdf/1504.07662.pdf>, Apr. 28, 2015, 9 pages.

Golbeck, Jenifer Ann, Computing and applying trust in we-based social networks, Diss. 2005, 199 pages.

Wang, Jyun-Cheng et al., "Recommending trusted online auction sellers using social network analysis". Expert Systems with Applications 34.3 (2008), pp. 1666-1679.

Shi-Jen Lin, et al., Combining ranking concept and social network analysis to detect collusive groups in online auctions, Expert Systems with Applications, vol. 30, Issue 10, (2012), pp. 9079-9086.

Paula Bernier; Genesys Interactive Voice Response; <http://www.genesys.com/solutions/customer-engagement/inbound/intelligent-voice-response>, Oct. 3, 2017; 3 pages.

Paula Bernier; Genesys Speech & Text Analytics; <http://www.genesys.com/solutions/employee-engagement/workforce-optimization/workforce-planning/speech-text-analytics>, Oct. 3, 2017; 4 pages.

W.F. Cody et al., The integration of business intelligence and knowledge management; IBM Systems Journal, vol. 41, No. 4; <https://pdfs.semanticscholar.org/3803/10409dd7822c6007d5c76808b8c28698e2cd.pdf>, Jul. 12, 2002; 17 pages.

Dawn Jutla; Enabling and Measuring Electronic Customer Relationship Management Readiness; Proceedings of the 34th Hawaii International Conference on System Sciences—2001; <http://www.computer.org/csdl/proceedings/hicss/2001/0981/07/09817023.pdf>, Aug. 7, 2002; 19 pages.

Gianmario Motta et al.; Forecasting in multi-skill call centers; 2013 Fifth International Conference on Service Science and Innovation (ICSSI); <http://ieeexploreieee.ieee.org/abstract/document/6599389/>, Oct. 24, 2013; 7 pages.

Haipeng Shen et al.; Forecasting Time Series of Inhomogenous Poisson Processes with Application to Call Center Workforce Management; The Annals of Applied Statistics; <https://www.unc.edu/~haipeng/publication/poissonSVD.pdf>, Jul. 25, 2008; 25 pages.

Evgeny Stepanov <https://www.researchgate.net/profile/Evgeny_Stepanov> et al.; Automatic Summarization of Call-center Conversations; Conference: IEEE Automatic Speech Recognition and Understanding Workshop (ASRU 2015); <https://www.researchgate.net/publication/282976793_Automatic_Summarization_of_Call-center_Conversations>, Dec. 2015; 3 pages.

\* cited by examiner

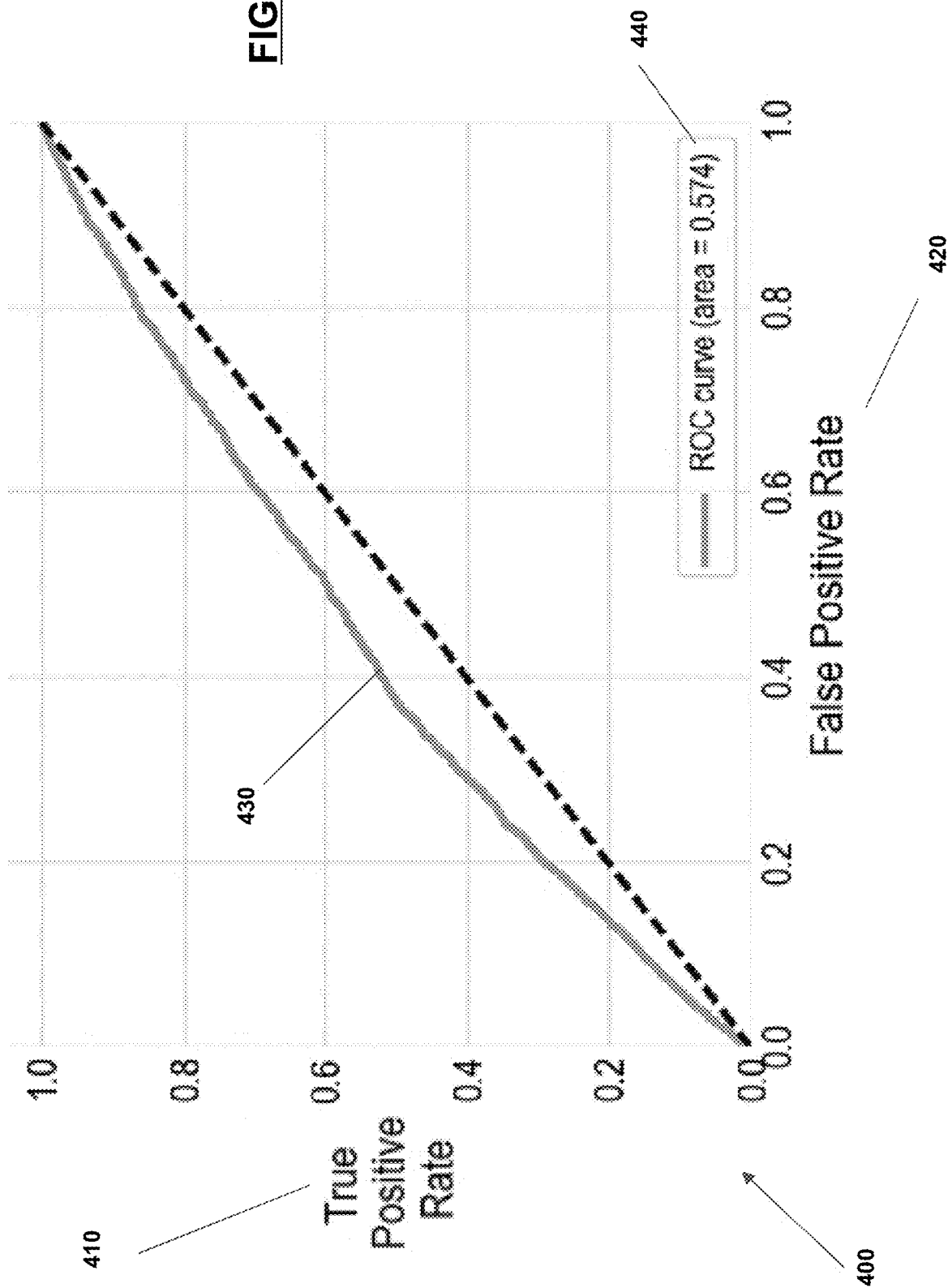

SYSTEM AND METHOD FOR MANAGING ROUTING OF CUSTOMER CALLS TO AGENTS

CROSS-REFERENCE TO RELATED APPLICATIONS

The application is a continuation of U.S. patent application Ser. No. 16/267,331, entitled "SYSTEM AND METHOD FOR MANAGING ROUTING OF CUSTOMER CALLS TO AGENTS," filed Feb. 4, 2019, which is a continuation of U.S. patent application Ser. No. 16/111,011, entitled "SYSTEM AND METHOD FOR MANAGING ROUTING OF CUSTOMER CALLS TO AGENTS," filed Aug. 23, 2018, which claims the benefit of U.S. Provisional App. No. 62/551,690, filed Aug. 29, 2017, claims the benefit of U.S. Provisional App. No. 62/648,325, filed Mar. 26, 2018, claims the benefit of U.S. Provisional App. No. 62/648,330, filed Mar. 26, 2018, and claims the benefit of U.S. Provisional App. No. 62/687,130, filed Jun. 19, 2018, all of which are incorporated by reference in their entirety.

TECHNICAL FIELD

The present disclosure relates generally to customer contact centers and their operation and, more particularly, to a system and method for managing routing of customer calls to agents.

BACKGROUND

Customer contact centers provide an important interface for customers/partners of an organization to contact the organization. The contact can be for a request for a product or service, for trouble reporting, service request, etc. The contact mechanism in a conventional call center is via a telephone, but it could be via a number of other electronic channels, including email, online chat, etc.

The contact center consists of a number of human agents, each assigned to a telecommunication device, such as a phone or a computer for conducting email or Internet chat sessions, that is connected to a central switch. Using these devices, the agents generally provide sales, customer service or technical support to the customers or prospective customers of a contact center, or of a contact center's clients. Conventionally, a contact center operation includes a switch system that connects callers to agents. In an inbound contact center, these switches route inbound callers to a particular agent in a contact center or, if multiple contact centers are deployed, to a particular contact center for further routing. When a call is received at a contact center (which can be physically distributed, e.g., the agents may or may not be in a single physical location), if a call is not answered immediately, the switch will typically place the caller on hold and then route the caller to the next agent that becomes available. This is sometimes referred to as placing the caller in a call queue. In conventional methods of routing inbound callers to agents, high business value calls can be subjected to a long wait while the low business value calls are often answered more promptly, possibly causing dissatisfaction on the part of the high business value caller.

In many call centers, the agents answering calls are organized into a plurality of groups or teams, with each group having primary responsibility of the calls in one or more call queues. Different agent groups often have responsibility for different goals or functions of the call center, such as generating customer leads, closing sales with prospects and servicing existing customers. Routing an inbound caller to an appropriate group or team of the call center to address the needs of that caller can be a burdensome, time-consuming process.

There is a need for a system and method for identifying high business value inbound callers at a call center during a time period in which inbound callers are awaiting connection to an agent. Additionally, there is a need to improve traditional methods of routing callers, such as "round-robin" caller routing, to improve allocation of limited call center resources to high business value inbound callers. Further, there a need to improve traditional methods of routing callers to a group or team of agents appropriate to the caller's needs from a plurality of agent groups that implement different functions or goals of the call center.

SUMMARY

Embodiments described herein can automatically route a call from a customer to one of a plurality of call queues associated with a plurality of groups of agents, based on information concerning an identified customer of an enterprise and predicted value of the telephone call to that enterprise. In a first step, the method retrieves from a customer database a set of enterprise customer data associated with an identified customer in a customer call. The customer database stores enterprise customer data associated with prospects, leads and purchasers of an enterprise, such as a sponsoring organization or client of the call center. In various embodiments, the enterprise customer data comprises one or more of customer event data, activity event data and attributions data.

In an embodiment, the process retrieves customer demographic data associated with the identified customer. In various embodiments, the customer demographic data may be associated with the identified customer by two or more identifying data including name of the identified customer, address of the identified customer and zip code of the identified customer.

The method and system selects a group of agents from a plurality of groups of agents of the call center, wherein the selected group of agents implements a predetermined customer care interaction of the call center. The group of agents is selected based upon consistency of the predetermined customer care interaction with the set of enterprise customer data for the identified customer.

The method and system executes a predictive model to determine a value prediction signal. In various embodiments, the value prediction signal includes one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product. In an embodiment, the predictive model determines the value prediction signal in real time by applying a logistic regression model in conjunction with a tree-based model to the retrieved customer demographic data.

Based on the value prediction signal determined, the selected predictive model classifies the identified customer into one of a first value group and a second value group. When the predictive model classifies the identified customer into the first value group, the call management system routes the customer call for the identified customer to a first call queue position for connection to an agent from the selected group of agents. When the predictive model classifies the identified customer into the second value group, the call management system routes the customer call for the identified customer to a second call queue position for connection to an agent from the selected group of agents.

In an embodiment of selecting the group of agents from the plurality of groups of agents based upon consistency of the predetermined customer care interaction with the set of enterprise customer data, the predetermined customer care interaction is customer development of leads, and the set of enterprise customer data includes customer event data associated with a prospect. In an embodiment, the predetermined customer care interaction is cross-selling of products, and the set of enterprise customer data includes customer event data associated with a purchaser and activity event data indicating likelihood of an additional purchase. In another embodiment, the predetermined customer care interaction is promoting a given product, and the set of enterprise customer data includes activity event data indicating customer interest in a marketing campaign for the given product. In a further embodiment, the predetermined customer care interaction comprises closing product sales, and the set of enterprise customer data includes one or more of customer event data associated with a prospect, customer event data associated with a new business applicant, and attributions data associated with a prospect and a new business applicant.

The selected predictive model can include a logistic regression model and a tree-based model. In an embodiment, the logistic regression model employs $l_1$ regularization. In an embodiment, the logistic regression model employs $l_2$ regularization. In an embodiment, the tree-based model is a random forests ensemble learning method for classification.

The value prediction signal can include one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product. In various embodiments, the a value prediction signal is a buy-only signal, a lapse-only signal, a buy-don't-lapse signal, or combination of these signals.

In one embodiment, a processor-based method for managing customer calls within a call center, comprises, upon receiving a customer call at a call center from an identified customer, retrieving, by a processor, from a customer database that stores enterprise customer data associated with prospects, leads and purchasers of an enterprise, a set of the enterprise customer data associated with the identified customer in the customer call, wherein the set of the enterprise customer data comprises one or more of customer event data, activity event data and attributions data; retrieving, by the processor, customer demographic data associated with the identified customer in the customer call; selecting, by the processor, a group of agents from a plurality of groups of agents of the call center, wherein the selected group of agents implements a predetermined customer care interaction and is selected based upon consistency of the predetermined customer care interaction with the set of enterprise customer data; executing, by the processor, a predictive model to determine a value prediction signal in real time by applying a logistic regression model in conjunction with a tree-based model to the retrieved customer demographic data, the value prediction signal comprising one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product; classifying, by the predictive model executing on the processor based on the value prediction signal determined by the selected predictive model, the identified customer into one of a first value group and a second value group; and when the classifying step classifies the identified customer into the first value group, routing, by the processor, the customer call for the identified customer to a first call queue position in a call queue for connection to an agent from the selected group of agents; and when the classifying step classifies the identified customer into the second value group, routing, by the processor, the customer call for the identified customer to a second call queue position in a call queue for connection to an agent from the selected group of agents.

In an embodiment, a system for managing customer calls within a call center comprises an inbound telephone call-receiving device for receiving a customer call to the call center; non-transitory machine-readable memory that stores a customer database including enterprise customer data associated with prospects, leads and purchasers of an enterprise serviced by the call center, wherein the enterprise customer data comprises customer event data, activity event data and attributions data; a processor configured to execute an inbound queue management module and a predictive modeling module, the predictive modeling module is configured to store a predictive model of customer value, wherein the predictive model comprises a logistic regression model operating in conjunction with a first tree-based model, wherein the processor in communication with the non-transitory machine-readable memory executes a set of instructions instructing the processor to: upon receiving the customer call at the inbound telephone call-receiving device from an identified customer, retrieve from the customer database a set of the enterprise customer data associated with the identified customer in the customer call, wherein the set of enterprise customer data comprises one or more of the customer event data, the activity event data and the attributions data; retrieves external third-party customer demographic data associated with the identified customer; selects a group of agents that implements a predetermined customer care interaction from a plurality of groups of agents of the call center, based upon consistency of the predetermined customer care interaction with the set of enterprise customer data; determines a value prediction signal for the identified customer via applying the predictive model to the set of the enterprise customer data; classifies the identified customer into one of a first value group and a second value group based on the value prediction signal determined; and directs the inbound telephone call-receiving device: when the inbound queue management module classifies the identified customer into the first value group, to route the customer call for the identified customer to a first call queue position in a call queue for connection to an agent from the selected group of agents; and when the inbound queue management module classifies the identified customer into the second value group, to route the customer call for the identified customer to a second call queue position in a call queue for connection to an agent from the selected group of agents.

Other objects, features and advantages of the present disclosure will become apparent with reference to the drawings and detailed description of the illustrative embodiments that follow.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 4A is a graph of a receiver operator curve (ROC) for a value prediction model, in accordance with an embodiment.

DETAILED DESCRIPTION

Figure 1:
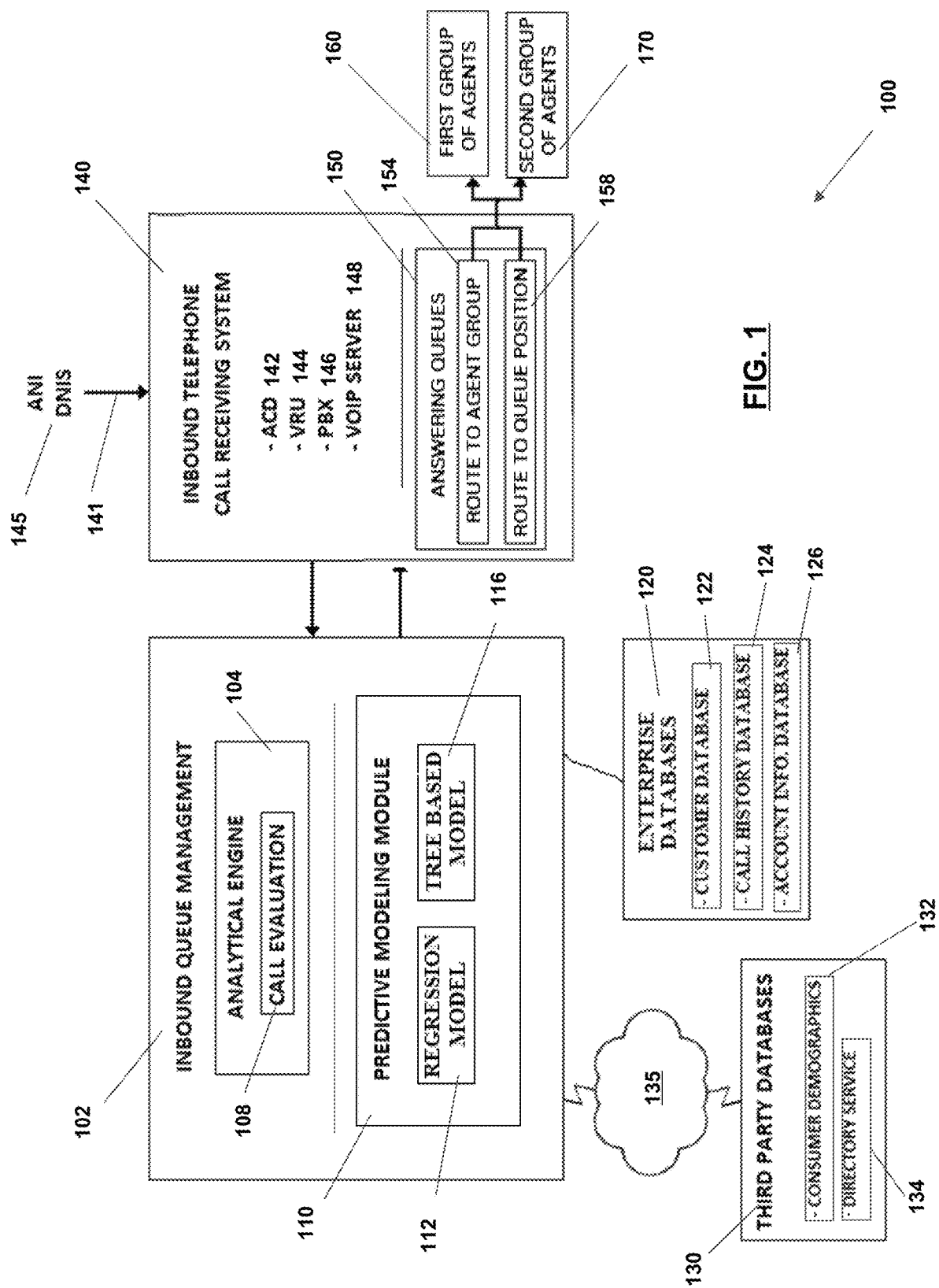
FIG. 1 is a system architecture for a customer management system of a contact center, in accordance with an embodiment of the invention.

In the following detailed description, reference is made to the accompanying drawings, which depict non-limiting, illustrative embodiments of the present disclosure. Other embodiments may be utilized and logical variations, e.g., structural and/or mechanical, may be implemented without departing from the scope of the present disclosure. To avoid unnecessary detail, certain information, items or details known to those skilled in the art may be omitted from the following.

Contact routing at an inbound contact center can be structured in numerous ways. An individual employed by the contact center to interact with callers is referred to in the present disclosure as an "agent." Contact routing can be structured to connect callers to agents that have been idle for the longest period of time. In the case of an inbound caller where only one agent may be available, that agent is generally selected for the caller without further analysis. In another example of routing an inbound call, if there are eight agents at a contact center, and seven are occupied with callers, the switch will generally route the inbound caller to the one agent that is available. If all eight agents are occupied with contacts, the switch will typically put the caller on hold and then route the caller to the next agent that becomes available. More generally, the contact center will set up a queue of inbound callers and preferentially route the longest-waiting callers to the agents that become available over time. A pattern of routing callers to either the first available agent or the longest-waiting agent is sometimes referred to as "round-robin" caller routing.

In general, when a caller is placed in a call queue, the caller's queue position is dependent upon the receipt time of the call at the vendor location. No consideration is given to the identity of the caller or the potential value of the call. While this is a democratic way to handle inbound calls, it may not be good for business. For instance, a large number of low business value calls may be in a queue when a high business value call is received. As a result, the high business value call is subjected to a long wait while the low business value calls are answered—with attendant dissatisfaction on the part of the high business value caller. When call centers have an inadequate number of skilled agents to handle all callers, such as at times of peak call volume, challenges of effectively handling high-value callers can be especially severe. The method and system of the present disclosure are intended to alleviate these problems.

Call center operations include various types of call queues. For example, an inbound caller may be put on hold and placed on an answering queue or hold list, to be routed to a live agent when the caller has moved up to the first position in the call queue. In another example, if call centers are unable to route inbound callers to a live agent within a reasonable period of time, an inbound caller may be placed on a call-back list, to receive a call-back from a live agent when the caller has moved up to the first position on the call-back list.

In the system and method of the present disclosure, an inbound caller is routed to one of a plurality of groups of call center agents (e.g., two groups), respectively associated with a plurality of call queues. Each group of agents is assigned to implement one or more predetermined function or goal of the call center; in the present disclosure a given goal or function of the call center is called a "customer care interaction." Customer care interactions may be broad in scope, such as generating customer leads, closing sales of products of a sponsoring enterprise of the call center, and customer service interactions with existing customers or purchasers (individuals who previously purchased a product of the sponsoring enterprise). Customer care interactions also can be more specific in scope, such as promoting a given product as part of a marketing campaign. The systems and methods of the present disclosure improve the routing of inbound calls of identified customers to groups of agents that handle customer care interactions appropriate to the callers.

Methods and systems described herein can automatically assign an inbound call from a customer to a call queue position for connection to one of a plurality of groups of call center agents, wherein the queue call queue position is based on predicted value of the inbound telephone call. Upon receiving an inbound call, a call management system retrieves a set of enterprise customer data associated with an identified customer from a customer database. The system retrieves customer demographic data associated with the identified customer. The system selects a group of agents from a plurality of groups of agents of the call center, wherein the selected group of agents implements a predetermined customer care interaction of the call center. The group of agents is selected based upon consistency of the predetermined customer care interaction with the set of enterprise customer data for the identified customer.

A predictive model of the call management system determines a value prediction signal for the identified customer. Based on the value prediction signal determined, the predictive model classifies the identified customer into one of a first value group and a second value group. When the predictive model classifies the identified customer into the first value group, the call management system routes the customer call for the identified customer to a first call queue position for connection to an agent from the selected group of agents. When the predictive model classifies the identified customer into the second value group, the call management system routes the customer call for the identified customer to a second call queue position for connection to an agent from the selected group of agents.

In an embodiment, the first value group comprises customers having a first set of modeled values, and the second value group comprises customers having a second set of modeled values, wherein modeled values in the first set of modeled values are higher than modeled values in the second set of modeled values. In an embodiment, the modeled values are modeled lifetime values. In an embodiment, when the predictive model classifies the identified customer into the first value group having higher modeled values, the call management system assigns the identified customer to a priority queue assignment; when the predictive model classifies the identified customer into the second value group having lower modeled values, the call management system assigns the identified customer to a subordinate queue assignment. As used in the present disclosure, a priority queue assignment and subordinate queue assignment are relative terms, in which a priority queue assignment is more favorable than a subordinate queue assignment. In an embodiment, a priority queue assignment is a more advanced position within a call queue for connection to an agent from a selected group of agents than a subordinate queue assignment.

The customer database tracks individuals who are customers of a sponsoring organization or client of the call center, or other enterprise served by the call center, associating these individuals with one or more groups representing general types of customers. In an embodiment, these customer groups include prospects, leads, new business and purchasers (also herein called sales). The customer database joins these four groups to better evaluate marketing activities and customer service activities of the call center. Data from the customer database is used in selecting a group of agents from a plurality of groups of agents of the call center in routing an inbound caller that has been identified as a given customer in the customer database. The customer database can also be employed in building stronger predictive models used for routing inbound calls.

In the present disclosure, customer database data is sometimes called "enterprise customer data," denoting data relating to customers of the sponsoring enterprise. A set of enterprise customer data retrieved for an identified customer is used in selecting a suitable group of call center agents from a plurality of groups of call center agents of the call center, wherein the selected group of agents implements a predetermined customer care interaction of the call center. The group of agents is selected based upon consistency of the predetermined customer care interaction with the set of enterprise customer data for the identified customer. In an embodiment, enterprise customer data is associated with one or more enterprise customer records identifying a given customer tracked by the customer data. Enterprise customer data includes data identified with one or more customer groups (also herein called customer event data), activity event data and attributions data, among other types of data.

Methods and systems described herein can employ a predictive model relating to offering for sale one or more products offered or supplied by a sponsoring organization of an inbound contact center. In various embodiments, the products offered or supplied by a sponsoring organization require payments by the customer for a period following closing the sale, such as premiums to maintain in force an insurance policy or other financial product, or installment plans for product purchase. A pre-sale prediction model can incorporate information on a minimum period of time of customer payments required to achieve a beneficial transaction for the sponsoring organization and uses this information in determining conditions for "lapse". The presale predictive model forecasts customer behavior to improve the probability of closing a sale of an offered product to an inbound customer, and to reduce the probability that the customer will lapse in payment for the purchased product.

The predictive model can classify inbound callers into two or more value groups. In an embodiment, two value groups are modeled to model higher predicted value and lower predicted value, respectively, to the sponsoring organization. In various embodiments, this classification governs value-based routing of inbound telephone calls for response by agents, to allocate limited resources of the inbound contact center. An individual employed by the contact center to interact with callers is referred to herein as an "agent."

In the present disclosure, an inbound contact center is sometimes called simply a contact center or a call center. The individuals that interact with the contact center using a telecommunication device are referred to herein as callers, and alternatively are referred to as inbound callers, as customers, or as any of the general types of customer. As used in the present disclosure, a "customer" may be an existing customer or a prospective customer of the sponsoring organization, including any of the general groups of customers tracked in the customer database. In an embodiment, a customer is associated with the one or more of the groups: prospects, leads, new business and sales (also herein called purchasers). A given individual may be associated with multiple such groups over different stages of customer acquisition. For example, a purchaser may have previously been one or more of a prospect, a lead or a new business applicant.

In an embodiment of the customer groups in the customer database, "Prospects" are individuals that have contacted the enterprise. Inbound prospects may or may not be customers in the customer databases. In an embodiment, if an inbound caller is not identified with an individual in the customer database, the database opens a new record for that caller in the prospects group. "Leads" are individuals who have expressed interest in one or more products of the enterprise; as used herein products may include goods or services sold by the enterprise, or a combination of these. A lead may have previously been a prospect, or may not have been a prospect (e.g., an individual that searches for products or services of the enterprise online). "New Business" (also herein called new business applicants) identifies applicants to purchase one or more products of the enterprise, where such purchase requires underwriting. These applicants may have been prospects, leads or both. "Purchasers" (also herein called "sales") generally are individuals that own a product of the enterprise. Purchasers may have been prospects, leads, new business applicants or any combination of these groups.

A pre-sale prediction model can incorporate information on a minimum period of time of customer payments required to achieve a beneficial transaction for the sponsoring organization, and uses this information in determining conditions for "lapse." In an embodiment, pre-sale predictive models of the present disclosure incorporate a pre-determined period of time of payments following the sale of the product to define lapse. In certain embodiments, a sale of an insurance policy or other financial product requires only that the prospect complete an application to purchase the policy, sometimes called guaranteed acceptance. When selling via guaranteed acceptance, lapse rates for sold policies tend to be higher.

A key metric for value-based classification of a customer who has purchased a product is called a "lifetime value" of the product sale to that customer. In various embodiment, lifetime value includes the sum of all associated costs over product lifetime, netted against revenue for the product sale. The lifetime value for the product (insurance policy) sold to that customer is the net value of all premiums paid, over the sum of all such associated costs during that policy life.

In an illustrative embodiment involving sale of an insurance policy, associated costs over product lifetime include various sales acquisition costs, including marketing costs distributed across inbound calls, cost of operating the inbound contact center distributed across inbound calls, and commission at the time of sale. In this example, additional associated costs include cost of providing the insurance policy, and claims or death benefit. In various embodiments, total costs for a customer are modeled based on the customer's age, gender, policy face amount, and whether the policy is lapsed, and by applying formulas based on amortization of total marketing costs and operations costs. In an illustrative embodiment involving sale of an insurance policy, total revenue for a customer is modeled based on the customer's age, gender, policy face amount, and whether the policy is lapsed (if so, when). The model calculates expected total premium payments based on age and gender via lookup of mortality statistics.

Methods and systems described herein can identify lapse (e.g., for a given product or class of products) with a pre-determined period of time following sale of the product, and define lapse as failure of the customer to make payments for the product over at least this period of time. In various embodiments, this predetermined period of time is based upon modeling a minimum period of time for achieving a positive lifetime value for the product sale. This model compares total payments received with associated costs over different product lifetimes to determine the predetermined period. In one embodiment, product lifetime represents a period of time in which the customer has continued to make purchase payments for the product, such as premiums or installment payments. In another embodiment, lifetime value is measured during the full term or life of an insurance policy or other financial instrument until all claims and death benefits have been paid, even if all premiums or other customer payments had been paid prior to this time.

FIG. 1 shows a system architecture for a customer management system 100 of a contact center, also herein called a call center, according to an illustrative embodiment. In the present disclosure, the call center is sometimes called an inbound call center or inbound contact center, referring to its primary function of receiving inbound customer calls. However, it should be understood that communications of the inbound call center on occasion may include outbound calls, or call-backs, in response to inbound customer calls. Customer management system 100 includes an inbound queue management system 102, also called an inbound call management system. The inbound queue management system 102 may be hosted on one or more computers (or servers), and the at least one computer may include or be communicatively coupled to one or more databases. Inbound queue management system 102 manages assignment of inbound telephone calls for response by agents in a queue position of a call queue for connection to a group of call center agents selected from a plurality of groups of call center agents. The group of call center agents is selected based on enterprise customer data for the caller (identified customer), while the queue position is selected based on predicted value of the inbound telephone call. Inbound queue management system 102 includes an analytical engine 104 containing a call evaluation sub-module 108, and a predictive modeling module 110 including a regression model 112 and a tree-based model 116. The analytical engine 104, modules 108, 110, and models 112, 116 may be executed by a processor of the inbound queue management system 102.

Inbound call management system 102 is interfaced with one or more enterprise databases 120, which are internal databases of the inbound contact center. Internal databases include customer database 122, which tracks individuals who are customers of the sponsoring organization of the call center or other client enterprise. Other internal databases include call history database 124 and account information database 126. In an embodiment, analytical engine 104 interacts with external services, applications and databases, such as third-party databases 130, through one or more application programmable interfaces, an RSS feed, or some other structured format, via communication network 135. In the embodiment of FIG. 1, inbound queue management system 102 retrieves data from one or more third-party databases 130, including a consumer demographic database 132 and a directory service database 134.

Predictive modeling module 110 models behaviors of customers such as likelihood that a caller will purchase a product offered by the call center and likelihood that the caller will lapse in payments for a purchased product. The predictive modeling module analyzes each inbound customer call using data associated with a customer identifier for the inbound caller. This customer identifier may be obtained from various sources by the call evaluation sub-module 108, including enterprise customer data retrieved from customer database 122. Input data used in predictive modeling includes data retrieved from customer database 122 and may include data from other internal databases 120. Additionally, input data used in predictive modeling includes data from third-party databases 130. This input data also may include data derived from the retrieved data that has been transformed by analytical engine 104 in order to facilitate predictive modeling, as described herein.

Databases 120 are organized collections of data, stored in non-transitory, machine-readable storage. In an embodiment, the databases may execute or may be managed by database management systems (DBMS), which may be computer software applications that interact with users, other applications and the database itself, to capture (e.g., store data, update data) and analyze data (e.g., query data, execute data analysis algorithms). In some cases, the DBMS may execute or facilitate the definition, creation, querying, updating and/or administration of databases. The databases may conform to a well-known structural representational model, such as relational databases, object-oriented databases and network databases. Illustrative database management systems include MySQL, PostgreSQL, SQLite, Microsoft SQL Server, Microsoft Access, Oracle, SAP, dBASE, FoxPro, IBM DB2, LibreOffice Base, FileMaker Pro.

Analytical engine 104 can be executed by a server, one or more server computers, authorized client computing devices, smartphones, desktop computers, laptop computers, tablet computers, PDAs and other types of processor-controlled devices that receive, process and/or transmit digital data. Analytical engine 104 can be implemented using a single-processor system including one processor, or a multi-processor system including any number of suitable processors that may be employed to provide for parallel and/or sequential execution of one or more portions of the techniques described herein. Analytical engine 104 performs these operations as a result of central processing unit executing software instructions contained within a computer-readable medium, such as within memory. In one embodiment, the software instructions of the system are read into memory associated with the analytical engine 104 from another memory location, such as from storage device, or from another computing device via communication interface. In this embodiment, the software instructions contained within memory instruct the analytical engine 104 to perform processes described below. Alternatively, hardwired circuitry may be used in place of or in combination with software instructions to implement the processes described herein. Thus, implementations described herein are not limited to any specific combinations of hardware circuitry and software.

Analytical engine 104 stores customer care interaction data representing attributes of one or more predetermined customer care interactions implemented by each group of agents within of a plurality of groups 160, 170 of call center agents. Attributes of customer care interactions may include, for example, general areas of responsibility, specific areas of responsibility, primary agent skills, secondary agent skills, target customer groups, associated products, associated marketing campaigns, etc. As part of the process for routing a given inbound caller (identified customer) to call center agents, analytical engine 104 compares the stored customer care data with a set of enterprise customer data retrieved for that customer. Analytical engine 104 selects one of the plurality of groups of agents 160, 170 based upon consistency of the predetermined customer care interaction for the selected group of agents with the set of enterprise customer data retrieved for the identified customer.

Predictive modeling module 110 generates a value prediction signal representative of one or more of the following customer behaviors: (a) likelihood that the customer will accept an offer to purchase a product, (b) likelihood that the customer will lapse in payments for a purchased product, and (c) likelihood that the customer will accept an offer to purchase the product and will not lapse in payments for the purchased product. In certain embodiments, the predictive modeling module can predict more than one of these customer behaviors. For example, the predictive model may first determine the customer behavior (a) likelihood that the customer will accept an offer to purchase a product, followed by determining the customer behavior (b) likelihood that the customer will lapse in payments for a purchased product, in order to determine a value prediction signal. Based on this value prediction signal, the analytical module, in conjunction with the predictive modeling module, classifies each customer call into one of two, or more, value groups.

Depending on the group of agents selected and the value group determined for each customer call, analytical engine 104 directs routing of the customer call to answering queues module 150 to await connection to an agent of the call center. Answering queues module 150 includes a component 154 that routes the inbound call to a call queue for a given group of agents from a plurality of groups of agents, and a component 158 that assigns the inbound caller to a selected queue position in the selected call queue for live connection to an agent from the given group of agents. In FIG. 1, two groups of call center agents with respective call queues—first agent group/call queue 160 and second agent group/call queue 170—are shown. Routing inbound calls based on analysis of customer care interactions and of call value represents a significant improvement over traditional methods of routing callers, such as "round-robin" caller routing.

Inbound call management system 102 interfaces with an inbound telephone call-receiving system 140. In customer management system 100, inbound call management system 102 and call-receiving system 140 may be integrated in a single computing platform. Alternatively, these systems may be based on separate computing platforms. In certain embodiments, the computing platform(s) are interfaced with computer-telephone integration ("CTI") middleware. In an embodiment, inbound telephone call receiving system 140 includes a telephony device that accepts inbound telephone calls through a telephony interface 141, such as conventional T1 or fiber interfaces. Inbound telephone call receiving system 140 accepts inbound telephone calls through interface 141 and obtains caller information associated with the inbound calls, such as Automatic Number Identification ("ANI") and Dialed Number Identification Service ("DNIS") information 145. ANI is a signaling system feature in which a series of digits, either analog or digital, are included in the call identifying the source telephone number of the calling device. DNIS is a telephone function that sends the dialed telephone number to an answering service. The DNIS need not be a telephone number associated with any physical location.

Inbound telephone call receiving system 140 may include an Automatic Call Distributor ("ACD") system 142; a Voice Response Unit ("VRU") system 144; a private branch exchange ("PBX") switch 146; a Voice over Internet Protocol ("VOIP") server 148; or any combination of such devices. In an embodiment, intrasite telephony access within the call center may be managed by a private branch exchange (PBX) switch 146. In an embodiment, PBX switch 146 operates in coordination with ACD 142 to distribute inbound calls to customer service stations of locally networked call center agents. In further embodiments, inbound inquiries may include email or instant messages that provide inquiry information based on login ID, email address, IP or instant message address. In such an embodiment, the call center can gather additional information by an automated email or instant message survey response, which can be used to request various types of customer identifier data.

An identified customer can be an inbound caller for which the customer management system 100 has obtained reliable identifying data, including enterprise customer data retrieved from customer database 122. This data can be used by inbound queue management system 102 to retrieve or identify additional data associated with that customer. In an embodiment, an identified customer is a customer for which the system 100 has reliably identified at least one customer group associated with the customer in customer database 122, and at least two of name, address and zip code. In embodiments in which the customer has been associated over time with two or more customer groups, customer identifying data may include attributions (also herein called attributions data) retrieved by customer database 122, as further described below.

In an embodiment, Voice Response Unit ("VRU") system 144 collects customer identifier data, such as name, address and zip code, through automated interaction with the customer. In the present disclosure, this VRU data collection is sometimes called a telegreeter. For instance, VRU 144 may query an inbound caller to collect customer identifier information when ANI is not operative, e.g., when caller-ID is blocked. In an embodiment, inbound call management system 102 communicates with a third-party directory service 134, such as the WhitePages® online directory service. Directory service 134 can provide additional caller identification information, such as name and address information, for inbound callers that are initially identified only by a telephone number. For an inbound caller that is a new prospect of the enterprise, this additional caller identification information can be stored in customer database 122 as profile data for that prospect.

Inbound telephone calls received through interface 141 are distributed to call queue(s) routing module 150 for response by agents 160, 170 operating telephony devices. In an embodiment, agents are associated with a sponsoring organization that sells or supplies products with the assistance of the call center. In an embodiment, call center agents generate leads by qualifying prospects and by promoting products of the sponsoring organization. In an embodiment, the enterprise generates sales of one or more product through advertisements that give a phone number to prospective customers, and the prospective customers call into the call center using this phone number. In an illustrative embodiment, the agents in first group 160 implement the customer care interaction of offering an advertised product to a prospective customer (lead or new business applicant), while the agents in second group 170 implement the customer care interaction of customer service to existing customers. In another embodiment, a third group of agents (not shown) implements the customer care interaction of screening prospects to generate qualified leads.

In an embodiment, a sponsoring organization for customer management system 100 is an insurance company or other financial services company, and the agents may include insurance agents. In some cases, an insurance agent may be associated with only a single insurance provider (sometimes referred to as a "captive" insurance agent). In other cases, an "independent" insurance agent may be associated with several different insurance providers. In an embodiment of the system 100, the agents in the first group 160 are licensed to sell insurance. In some cases, the producers may be licensed to sell different types of insurance products, might have different areas of expertise, needs, etc. In some embodiments, agents in the first group 160 are selected for performance metrics related to sales. Agent sales performance may be measured by aggregate sales productivity metrics, as well as distributed performance metrics such as sales metrics by product types, etc.

In an embodiment the agents in the second group 170 are not authorized to offer the product(s) to the inbound caller (prospective customer, or lead), but these agents are authorized to screen leads for prospective customers. Such agents perform an important role in lead nurturing. Forwarding an inbound inquiry to a live agent with little or no wait time, sometimes referred to herein as a "warm transfer," has been observed to significantly increase probability of a successful sale to that customer in a later interaction. In some embodiments, agents in the second group 170 are selected for skills related to agent-customer communications, which can be measured in indicators of customer satisfaction such as feedback on customer experiences.

Figure 5:
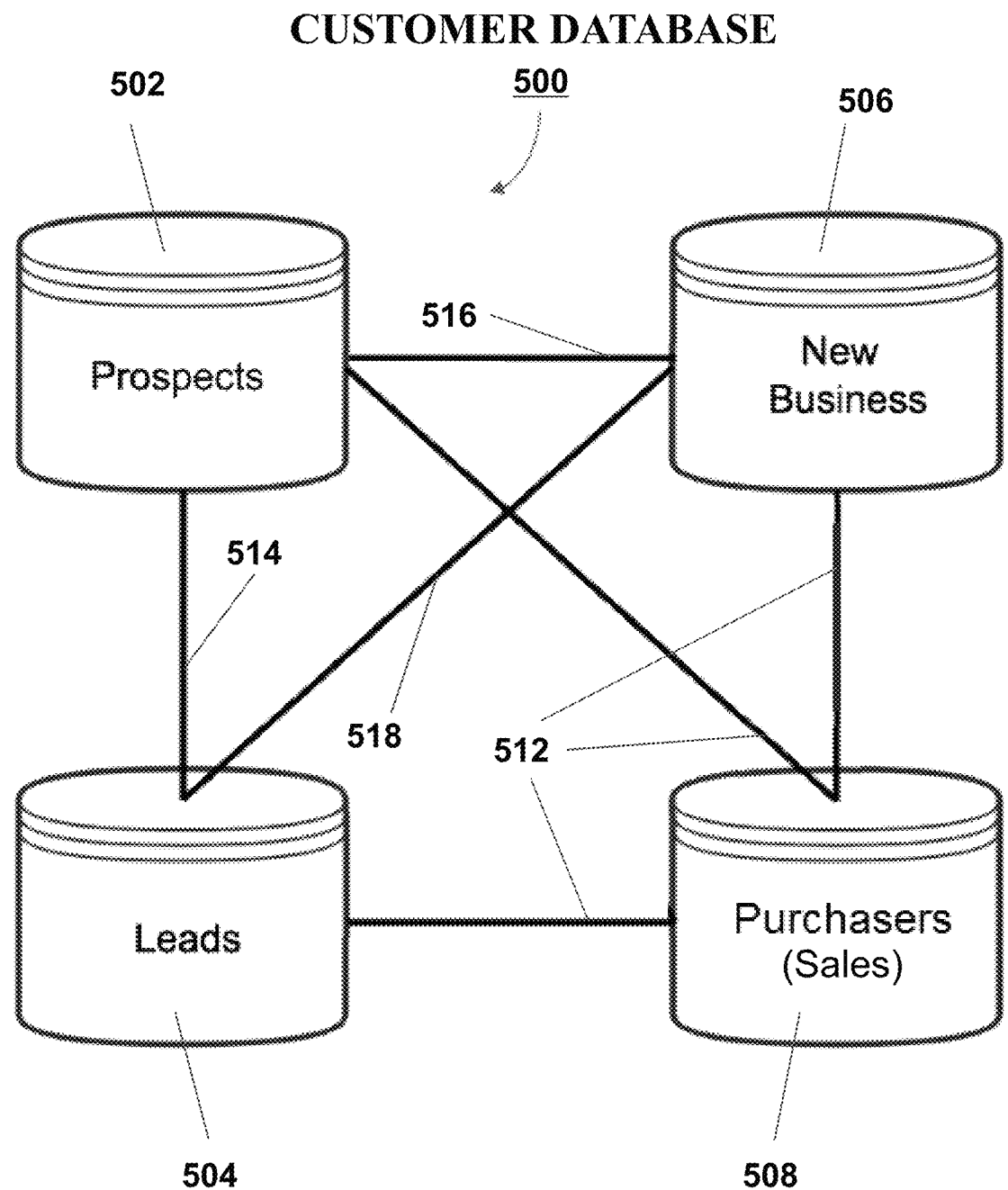
FIG. 5 is an architecture for a customer database including data stores for four groups of customers, in accordance with an embodiment.

FIG. 5 is an architecture of a customer database 500, representing an embodiment of the customer database 122 of FIG. 1. Customer database 500 is an internal database of the sponsoring organization of the call center or other enterprise. Customer database 500 stores information on individual customers of the enterprise, associating these customers with one or more of the groups Prospects 502, Leads 504, New Business 506 and Purchasers (Sales) 508. In the present disclosure, customer database records that identify individual customers of the enterprise, such as by name and phone number, are sometimes called "enterprise customer records." Customer database 500 includes links between each customer group and each of the other groups. These links between customer groups are sometimes herein called attributions. There are unique keys 512 between Purchasers (Sales) and each of the other data stores; a unique key 514 between Prospects 502 and Leads 504; a unique key 516 between Prospects 502 and New Business 506; and a unique key 518 between Leads 504 and New Business 506. In addition, customer database 500 tracks event data for customer-related activities, such as promotional activities, customer-prospecting activities, and call center CRM activities. Customer database 500 joins customer information across these four groups, as well as attributions and events data, in order to better match call center resources to customer needs, evaluate marketing and call center activities, build stronger models and generate useful reports.

In the embodiment of FIG. 1, enterprise customer data from customer database 500 is used in conjunction with customer data from third-party data sources 130, such as customer demographic data 132 and directory services data 134 based on phone number, to score incoming customers.

Customer database 500 employs attribution processes for tracking customers across events in customer acquisition and marketing. The objective of attribution is to track people across events: i.e., prospects, leads, applications and sales. Customer database 500 uses exact matching of personal details in order to determine which prospects may have become leads, submitted new business applications and/or bought products; and which leads may have submitted new business applications and/or bought products. In an embodiment, customer database 500 additionally employs matching algorithms for matching personal details with leads data retrieved from third-party demographic databases.

Figure 6:
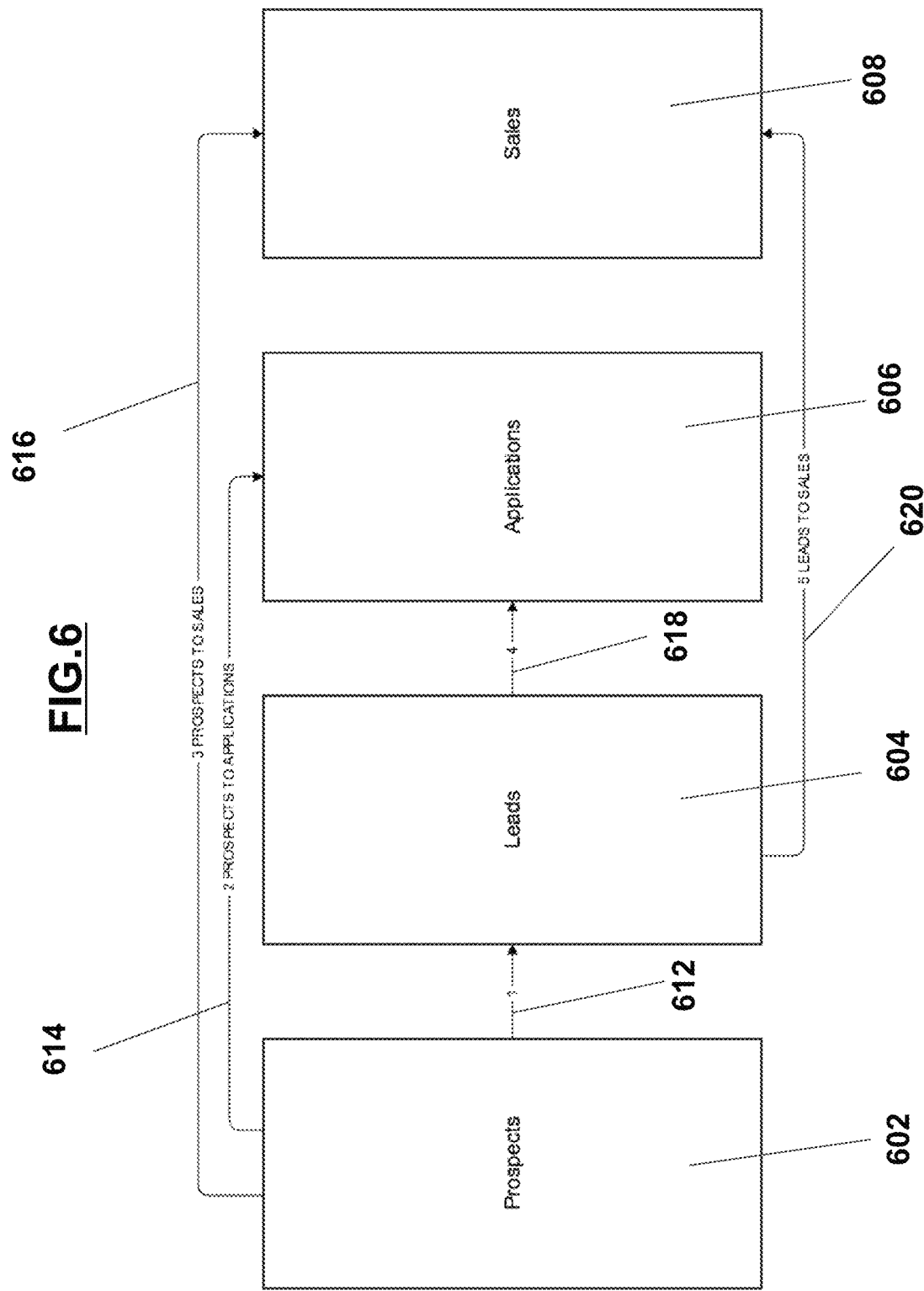
FIG. 6 is a flow chart diagram of attribution processes for tracking persons across events between customer groups (prospects, leads, new business applicants and sales), in accordance with an embodiment.

The flow chart diagram of FIG. 6 shows attribution processes for tracking persons across events between the customer groups. FIG. 6 shows four customer groups, herein sometimes called "customer event" data: prospects 602, leads 604, applications 606, and sales 608. An individual customer can follow several different paths. For example, the customer might be a prospect who goes straight to a sale; might go through the leads pipeline; might submit an application but never buy the product, etc. Events also can include activity events, such as promotional activities, customer prospecting activities, and call center CRM activities. In the present disclosure, customer database data tracking such activity events are sometimes called "activity event" data.

In an embodiment, events tracked by customer database 600 include pairs of events consisting of an event that occurs earlier in time (also herein called prior event; e.g., event A) and an event that occurs later in time (also herein called subsequent event; e.g., event B). Attributions, also called "attributions data" in the present disclosure, serve two primary functions. The first function is to trace all instances of a prior event A to see where these instances ended up. An example of this function is: "Find all leads, applications, and sales that resulted from prospecting activity on X date." The second function is to determine, for any record of a subsequent event B, which instance of event A most likely caused event B. An example of this function is: "Which prospecting activities were responsible for TERM product sales this month?"

Each arrow of FIG. 6 represents one of five attribution processes 612, 614, 616, 618, and 620. The illustrated embodiment does not include an attribution between applications and sales, because tracking between them is very simple. In another embodiment, the attributions would include an attribution between applications and sales. Each arrow is numbered (1, 2, 3, 4, or 5), representing the order in which these attribution processes are run. In an embodiment, each attribution process carries out the following steps, in order: (1) Match records between event A and event B, where event B occurs later in time. For example, in the prospect to leads attribution 612, prospect is event A and leads is event B; (2) Filter matches based on a time limit determined by business rules; (3) Determine the best match, i.e., the single record from event A that most likely led to each record from event B; and (4) Load unique best matches to the attribution table, updating the historical table.

Figure 7:
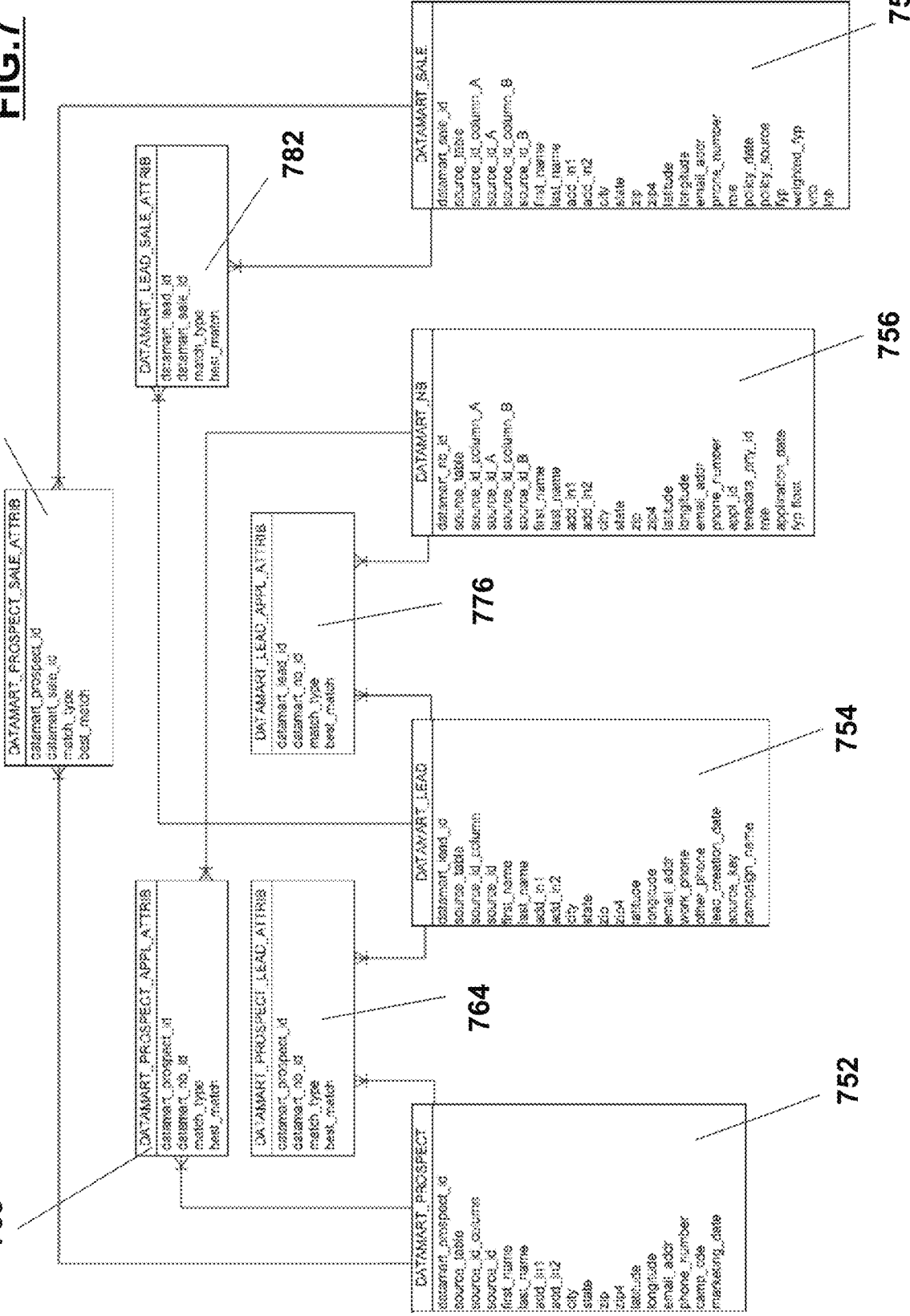
FIG. 7 is a schematic diagram of customer database event tables for the customer groups prospect, lead, new business and sale, and tables for attributions between events, in accordance with an embodiment.

FIG. 7 is a schematic diagram of customer database event tables for the customer groups prospect, lead, new business and sale, and of attribution tables between events. Customer database event tables pool all prospects, leads, applications and sales across the enterprise into four standardized tables 752, 754, 756, 758. In an embodiment, prospect events data include, e.g., camp_cde (code of the marketing campaign that targeted the prospect), and marketing date (earliest known date for the prospect). In an embodiment, leads events data include, e.g., lead creation date (earliest known date for the lead), and source_key (data that identifies the lead's corresponding prospect, where applicable). In an embodiment, new business events data includes, e.g., role (role of the person in the record has on an insurance policy, such as owner, insured, or payer), and fyp (first year premium). In an embodiment, Sale events data include, e.g., policy_date (earliest known date for the policy), and vnb (value of new business).

In an embodiment of the system of FIG. 1, various data in customer database 122 are also stored in other internal databases 120 of the enterprise, such as call history database 124 and account information database 126. The latter databases may act as source systems for customer database 122. Referring again to FIG. 7, customer database records may have values in the columns source table, source_id_column, and source_id, indicating how to access information in the source system.

Attribution creates attribution tables by applying rules to the customer database event tables. The attribution tables 764, 768, 772, 776, and 782 of FIG. 7 provide the basic data representing the relationship between each pair of events 752, 754, 756, 758. In addition, the customer database 700 can build overall tables that aggregate all the relationships between prospect, lead, new business and sales. For example, if a prospect is attributed to a lead, which in turn is attributed to a sale, an overall table would represent these relationships in a single row. In various embodiments, customer database builds reports via overall tables that apply analytics to select data using one or more of attribution tables 764, 768, 772, 776, and 782. In various embodiments, the analytics include criteria based on activity events.

In an example, the customer database 700 builds a report to answer the question: "What is the response rate for the Term to Perm campaign?" The customer database selects data using the marketing.datamart_prospect_lead_attrib table 764. The customer database applies analytics to focus on the Term to Perm marketing campaign, counting the number of leads generated from the total prospects. In another example, the customer database 700 builds a report to answer the question: "What is the conversion rate for the Retirement campaign?" The customer database selects data using the marketing.datamart_prospect_appl_attrib table 768. The customer database applies analytics to focus on the Retirement marketing campaign, counting the percentage of applications generated from the total prospects.

Figure 2:
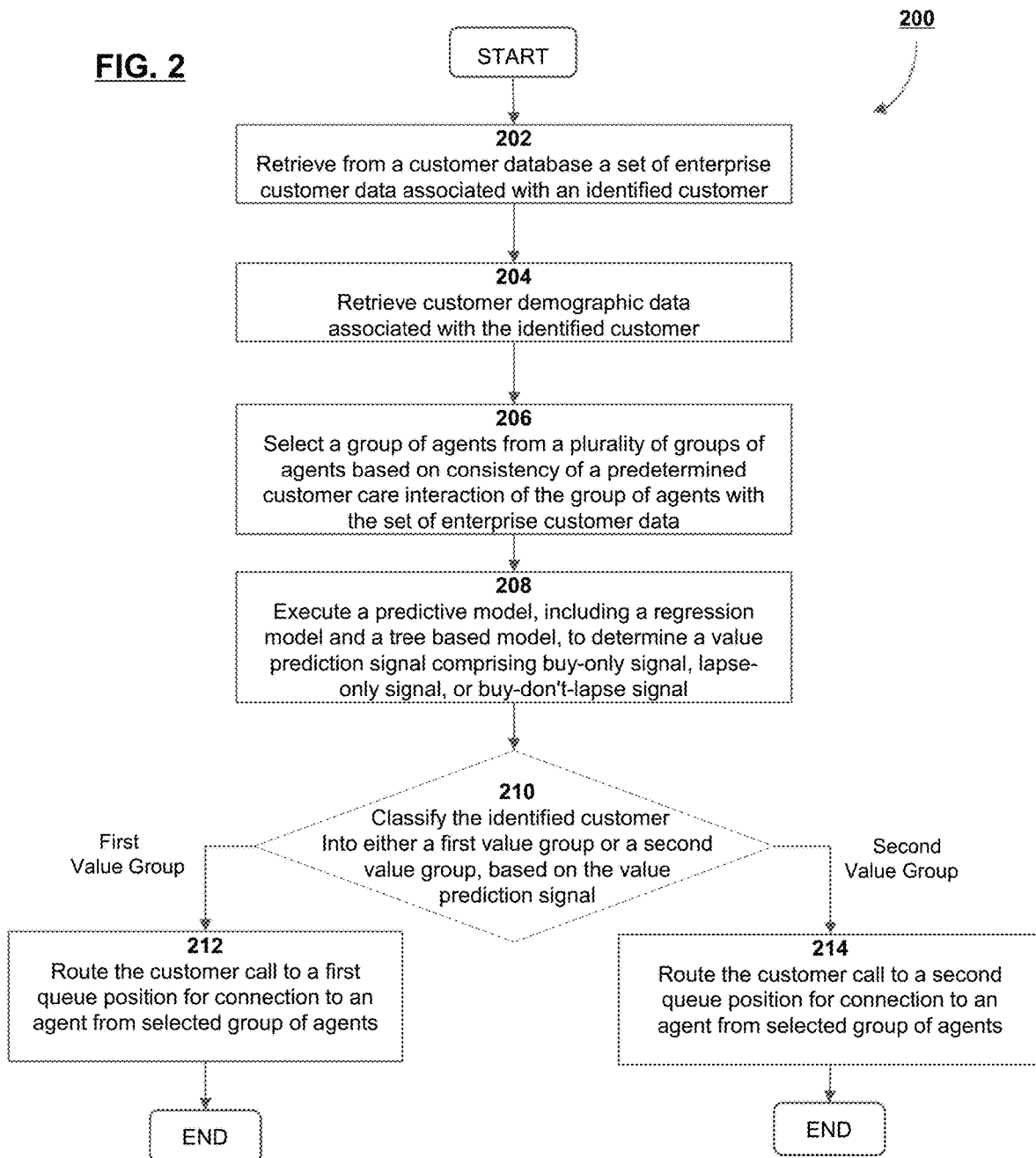
FIG. 2 illustrates a method for routing a customer call to an agent in accordance with an embodiment.

FIG. 2 is a flowchart of a call management process 200 for automatically routing an inbound call from an identified customer to a queue position within a call queue to be connected to a one of a plurality of call center agents. The selected group of agents implements a predetermined customer care interaction and is selected based upon consistency of the predetermined customer care interaction with enterprise data pertaining to the identified customer. The inbound call's queue position within the call queue for connection to the selected group of call center agents is based on a predicted value of the inbound telephone call.

The method 200 retrieves from a customer database a set of enterprise customer data associated with an identified customer in a customer call. The customer database stores enterprise customer data associated with prospects, leads, and purchasers of an enterprise. In certain embodiments, the customer database also stores enterprise customer data associated with new business applicants of the customer enterprise. The method additionally retrieves customer demographic data associated with the identified customer.

The method 200 selects a group of agents from a plurality of groups of agents of the call center, wherein the selected group of agents implements a predetermined customer care interaction of the call center. The group of agents is selected based upon consistency of the predetermined customer care interaction with the set of enterprise customer data for the identified customer.

A predictive model, including a logistic regression model operating in conjunction with a tree-based model, determines a value prediction signal for the identified customer. Based on the value prediction signal determined, the predictive model classifies the identified customer into one of a first value group and a second value group. When the predictive model classifies the identified customer into the first value group, the call management system routes the customer call for the identified customer to a first call queue position for connection to an agent from the selected group of agents. When the predictive model classifies the identified customer into the second value group, the call management system routes the customer call for the identified customer to a second call queue position for connection to an agent from the selected group of agents.

The steps of process 200 may be performed by one or more computing devices or processors in the customer management system of FIG. 1. In an embodiment, the plurality of steps included in process 200 may be performed by an inbound queue management system 102 of a customer management system 100 of a call center, in operative communication with an inbound call-receiving system 140 that receives a customer call of the identified customer.

The call management process 200 is initiated at step 202 in response to the customer management system 100 receiving an incoming customer call, by retrieving from a customer database enterprise customer data associated with an identified customer in the customer call. The customer database stores enterprise customer data associated with prospects, leads and purchasers of an enterprise. In various embodiments, the enterprise customer data used in selecting the selected predictive model comprises one or more of customer event data, activity event data, and attributions data. In certain embodiments, the customer database also stores enterprise customer data associated with new business applicants of the enterprise.

At step 204, the call management process retrieves customer demographic data associated with the identified customer. In an embodiment, the process retrieves the customer demographic data from a third-party database. In an embodiment, the third-party customer demographic data is associated with identified customer by matching the data to one or more enterprise customer identifiers stored by the customer database. In an embodiment, the call management process builds a simplified data file from the retrieved third-party demographic data as input to further steps of the process.

At step 206, the method selects a group of agents from a plurality of groups of agents of the call center, wherein the selected group of agents implements a predetermined customer care interaction of the call center. The group of agents is selected based upon consistency of the predetermined customer care interaction with the set of enterprise customer data retrieved from the customer database at step 202.

In an embodiment of step 206, a first predictive model from the plurality of predictive models is selected if the enterprise customer data satisfies predetermined model selection criteria, and a second predictive model from the plurality of predictive models is selected if the enterprise customer data does not satisfy the predetermined model selection criteria. In another embodiment of step 206, the selected predictive model is selected from three or more predictive models.

In various embodiments of step 206, the group of agents is selected based upon enterprise customer data for the inbound caller including one or more of customer event data, activity event data and attributions data. In an embodiment, the group of agents is selected to increase the likelihood of achieving one or more predetermined customer care interaction based upon consistency with the enterprise customer data for that group of agents.

In an illustrative embodiment of step 206, the predetermined customer care interaction is customer development of leads, and the set of enterprise customer data includes customer event data associated with a prospect. In another example, the predetermined customer care interaction is cross-selling of products, and the set of enterprise customer data includes customer event data associated with a purchaser and activity event data indicating likelihood of an additional purchase. In another example, the predetermined customer care interaction is promoting a given product, and the set of enterprise customer data includes activity event data indicating customer interest in a marketing campaign for the given product. In a further example, the predetermined customer care interaction is closing product sales, and the set of enterprise customer data includes one or more of customer event data associated with a prospect, customer event data associated with a new business applicant, and attributions data associated with a prospect and a new business applicant.

At step 208, the call management process executes a predictive model to determine a value prediction signal. In an embodiment, the predictive model applies a logistic regression model in conjunction with a tree-based model to the retrieved customer demographic data. In an embodiment, the call management process executes the predictive model to determine the value prediction signal in real time. By determining the value prediction signal in real time, the present method expeditiously routes an incoming customer call to a call queue for connection to an agent from a selected group of call center agents.

In various embodiments of step 208, the value prediction signal includes one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product.

In various embodiments of step 208, the value prediction signal determines a likelihood that the identified customer will lapse in payments for a purchased product by determining a likelihood that the identified customer will fail to make a payment for the purchased product during a predetermined time period following purchase of the purchased product. In an embodiment, the predetermined time period was previously determined by modeling lifetime value over varying durations of the time period following purchase of the purchased product.

In various embodiments of step 208, the regression model employs $l_1$ regularization. In various embodiments, the logistic regression model employs l2 regularization. In various embodiments, the tree-based model is a random forests ensemble learning method for classification.

At step 210, the call management process classifies the customer call for the identified customer into either a first value group or a second value group, based on the value prediction signal determined at step 208. In an embodiment of step 210, the first value group includes customers having a first set of modeled lifetime values, and the second value group includes customers having a second set of modeled lifetime values. The modeled lifetime values in the first set of modeled lifetime values are higher than modeled lifetime values in the second set of modeled lifetime values.

When step 210 classifies the identified customer into the first value group, at step 212 the call management process routes the customer call for the identified customer to a first call queue position for connection to an agent from the selected group of agents. When step 210 classifies the identified customer into the second value group, at step 214 the call management process routes the customer call for the identified customer to a second call queue position for connection to an agent from the selected group of agents.

In an embodiment of steps 212, 214, the call queues are hold lists for callers on hold. In another embodiment, the call queues are call back queues.

In embodiments of step 210 in which the first value group includes customers having modeled lifetime values that are higher than modeled lifetime values of customers in the second value group, steps 212, 214 prioritize call center resources to the higher-value group of customers.

Figure 3:
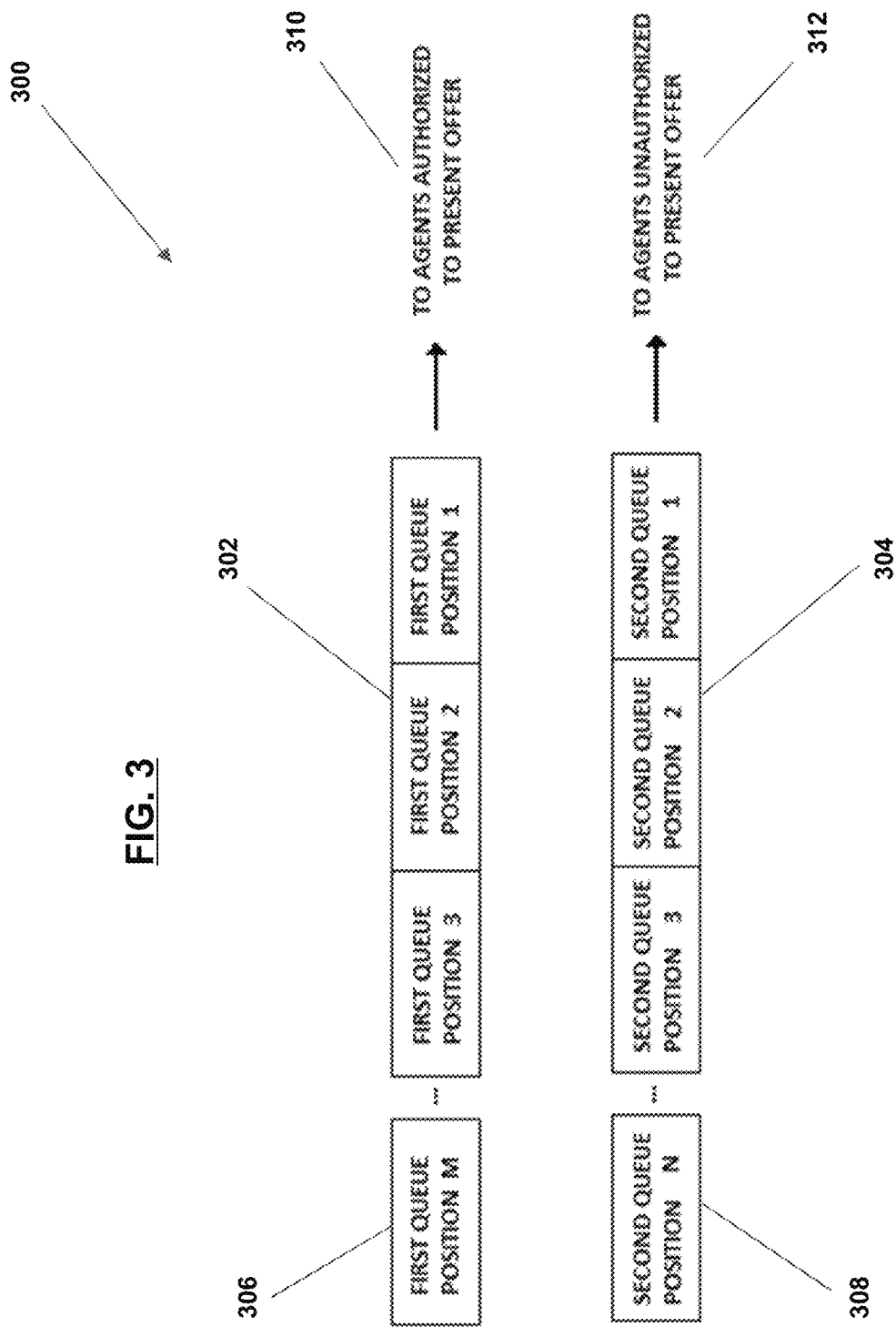
FIG. 3 illustrates a queue arrangement for routing prospective customers to agents of a call center, in accordance with an embodiment.

As seen in the schematic diagram of a customer queue arrangement 300 at FIG. 3, first call queue 302 consists of a queue of length M (last queue position 306), to be connected to agents 310 in a first group of agents who are assigned to implement a first predetermined customer care interaction. Second call queue 304 consists of a queue of length N (last queue position 308), to be connected to agents 312 in a second group of agents who are assigned to implement a second predetermined customer care interaction In an embodiment, steps 212, 214 provide normal (FIFO) queuing for callers within a given value group, and assign priority queue positions to one value group and subordinate queue positions to another value group. In various embodiments, the first queue position is located behind other callers who were previously assigned a first queue position in that call queue, and the second queue position is located behind the queue position of other callers who were previously assigned a second queue position in that call queue. For example, in first call queue 302, if the most recent prior assignment of a first queue position was to queue position M, the current assignment of a first queue position could be to a new queue position M+1 (not shown). If the most recent prior assignment of a second queue position was to queue position 3, the current assignment of a second queue position could be to insert the current inbound caller into queue position 4, and to adjust the prior caller at queue position 4 to queue position 5, adjust the prior caller at queue position 5 to queue position 6, etc.

In an embodiment of steps 212, 214, the longest-waiting callers on hold in the subordinate value group may have a more advanced position in the queue than the shortest-waiting callers on hold in the priority value group. In an example of this arrangement, the first queue position is the subordinate queue position and the second queue position is the priority queue position. At step 214, the method assigns a second queue position to a current inbound caller that is behind the most recently assigned second queue position, and is behind any callers previously assigned a first queue position who have waited more than a predetermined period of time for connection to an agent.

In an illustrative embodiment, customer management system 100 utilizes data from both internal and external sources in pre-sale predictive modeling of sale of a financial product (insurance policy). The data includes internal data 120 of the call center that tracks historical information about leads, customers, and marketing costs of the call center, including historical sales and lapse information. In an embodiment, these internal databases use rmm_analytics schema in data warehouse software. In an embodiment, internal databases 120 use rmm_analytics schema to generate a table of enterprise customer data. In another embodiment, internal databases 120 use rmm_analytics schema to generate additional data tables, such as a table of historical lead and customer data, and a table of marketing costs data.

In an embodiment, rmm_analytics schema include sales and lapse data for current and/or historical leads of the enterprise, which data is used in building predictive models of the present disclosure. In an illustrative embodiment, a paid_flag indicates policy payments and a related field shows the amount of each payment. In the present disclosure these data are called payment data. In an illustrative embodiment, either a lapse_flag or surrendered_flag indicate that a policy has lapsed. In the present disclosure these data are called lapse data. In an embodiment, date fields are used for filtering data by date range. In an illustrative embodiment, information about leads, customers, and marketing costs was used to model a pre-determined period of time of payments following the sale of the product that defines lapse. In an illustrative embodiment, for the purpose of pre-sale predictive modeling of sale of an insurance policy, this modeling resulted in defining lapse as failure of the customer to maintain a purchased policy in force for at least 18 months.

In building the predictive models of the present disclosure, model datasets may have populations in the hundreds of thousands or millions of individuals. Model datasets may include training datasets and testing datasets. Filtering techniques can be applied to eliminate false data and for de duplicating, reducing the number of records but significantly improving quality of model datasets. In an illustrative embodiment, date-filtered data such as payment data and lapse data within an older date range are used for building a training data set, and date-filtered data within a more recent range are used for building a test data set. In an illustrative embodiment, predictive machine-learning models of the present disclosure are continually trained using updated payment data, lapse data, and customer demographic data.

In an embodiment, in building predictive models, rmm_analytics schema in VERTICA are filtered based on the flow of historical leads through the inbound call center routing process. In an embodiment, the data are filtered to select only historical leads that were connected to a live agent; in the present disclosure this flow is sometimes called a "warm transfer." Applicant has observed that building predictive models based on a population limited to warm transfers can improve performance of models for predicting sales and lapse behaviors.

In the illustrative embodiment, data used in predictive modeling also include data retrieved from a customer demographic database 132 to obtain information about customers. In an embodiment, the customer demographic data includes individual-level data on customers. In various embodiments, as a prerequisite to using the data in predictive modeling of a given inbound caller (customer), analytical engine 104 associates the customer demographic data with a customer identifier for the customer. In an illustrative embodiment, customer demographic data used in pre-sale modeling of a customer requires an exact match of name and address.

In an embodiment, customer demographic data also includes data using zip-level features of the system, which provide a coarser representation in building the predictive model. Such zip-level features employ variables in the system that have resolution at the zip-level for each individual in the zip code. In an illustrative embodiment, zip-level data for individual income is associated with a zip code median value. Reasons for using zip-level data in predictive modeling include, for example, lack of a statistically significant difference in model performance as a function of any polymr match score threshold; simplicity of collecting only the name and zip code in the telegreeter process; and privacy considerations as to individual-level data.

In various embodiments embodiment, in predictive modeling of inbound callers, inbound queue management system 102 uses a fast-lookup tool such as polymr that analyzes customer identifiers of inbound callers in real time to retrieve customer data, such as customer demographic data, matched to the customer identifiers (https://github.com/massmutual/polymr). In an embodiment, the polymr fast-lookup tool is a lightweight, extensible search engine or API, implemented in the Python object-oriented programming language, https://www.python.org/. In various embodiments, the polymr tool performs real time matching of data in the customer demographic database 132 to a customer identifier for a given lead. In various embodiments, as a preliminary to using data in real-time predictive modeling of inbound callers, inbound queue management system 102 indexes the data by applying the search engine to customer identifiers in customer training data, and stores this index as an internal enterprise database 120.

In an embodiment, inbound queue management system 102 labels each data element in Acxiom as continuous (including interval), binary, ordinal or nominal (categorical). For use in a logistic regression model 114, variables that have lookup fields are converted to integers. Following feature transformation of the variables, the final view outputs each variable with human-readable names (if known), and a tag at the end of the variable name. Illustrative end tags for transformed variable names include:

_binary: either 0 or 1
_ordinal_to_binary: either 0 or 1, where null values are mapped to 0
_flat_binary: mapped from a string field like "01001000" into multiple fields
_ordinal: as an integer, with null values left null
_interval: as an integer, with null values left null
_continuous: as an integer, with null values left null
_nominal: as an integer, with null values mapped to an additional integer By applying the feature transformation rules described above, analytical engine 104 builds a simplified input data file from data retrieved. This simplified input data file facilitates predictive modeling with a binary target.

Predictive modeling module 110 builds both a regression model 114 and a tree-based model 118. In an embodiment, the predictive modeling module 110 trains a logistic regression model 114 with $l_1$ regularization on the full set of features of the Acxiom database. Use of logistic regression for classification problems provides performance advantages over standard linear regression, because application of the logistic function to the raw model score maps the output precisely from 0→1 while providing a smooth decision boundary. In an embodiment, the logistic regression model with $l_1$ regularization utilizes LASSO (Least Absolute Shrinkage and Selection Operator), a regression analysis method that performs both variable selection and regularization to enhance prediction accuracy and ease of interpretation of the resulting statistical model.

$l_1$ regularization provides the benefit of simplifying the selection of features through the model training process by constraining features with lower correlation to have 0 weight. The general form for a linear model can be indicated as:

$$\hat{y}(w,x) = w_o + w_1 x_1 + \ldots + w_p x_p$$

for $\hat{y}$ to be predicted from data points in the array x by learned coefficients w. The $l_1$ regularization is achieved by adding a term to the cost function, as follows:

$$\min_w \frac{1}{2n_{samples}} \|Xw - y\|_2^2 + a\|w\|_1$$

with regularization weight a. Applicant observed in training a logistic regression model with $l_1$ regularization, that run time of training increases rapidly with greater regularization parameters, with best model performance at low values of the regularization parameter a. In an embodiment, the logistic regression model with $l_1$ regularization sets the regularization parameter a using cross-validation, with best-performing values typically around 0.005-0.01.

In another embodiment, regression model employs logistic regression with l2 regularization, sometimes called ridge regression, according to the formula:

$$\min_w \frac{1}{2n_{samples}} \|Xw - y\|_2^2 + a\|w\|_2$$

In the l2 regularization model, as in the $l_1$ regularization model, the regularization weight a is set by cross-validation. In an embodiment, a logistic regression model with l2 regularization uses a backward feature selection procedure to select an optimal number of features. This feature selection procedure is the RFECV method for recursive feature elimination in Scikit-learn, a software machine learning library for the Python programming language, available at https://github.com/scikit-learn/scikit-learn.

In various embodiments, both $l_1$ and $l_2$ regularization models fit a regularization hyperparameter using five folds for cross-validation and searching across the seven parameters: [0, 0.001, 0.005, 0.01, 0.1, 0.5, 1]. In repeated iterations of model training, this range is restricted around previously successful settings.

In an embodiment, the tree-based model 118 is a random forests model. Random forests is a class of ensemble methods used for classification problems. Random forests models work by fitting an ensemble of decision-tree classifiers on sub samples of the data. Each tree only sees a portion of the data, drawing samples of equal size with replacement. Each tree can use only a limited number of features. By averaging the output of classification across the ensemble, the random forests model can limit over-fitting that might otherwise occur in a decision tree model.

In an embodiment, the tree-based model 118 uses the random forests model in Python's scikit-learn. In an illustrative embodiment, the tree-based model 118 uses the following parameters in the scikit-learn random forests model:

Maximum tree depth: 3 or ∞, set with max_depth.
Maximum number of features considered when looking for the best split: 3→6, set with max features.
Minimum number of samples required to split a node of the tree: 2→11, set with min samples split.
Minimum number of samples to be a leaf node: 1→11, set with min samples leaf
Number of trees in the forest: 100 or 200, set by n_estimators.
Whether to sample with replacement for the data seen by each tree: true or false, set by bootstrap.
Function to measure quality of a split: Gini or Entropy (information gain), set as criterion.

In an embodiment, for each customer the predictive model generates a value prediction signal indicative of potential value of a sales transaction for that customer. The predictive model can provide various types of value prediction signal including, for example: (a) buy-only signal, representative of the likelihood that the customer will accept the offer to purchase the product; (b) lapse-only signal representative of the likelihood that the customer will lapse in payments for the purchased product; (c) buy-don't-lapse signal representative of the likelihood that the customer will accept the offer to purchase the financial product and will not lapse in payments for the purchased product; as well as predictive models providing combinations of these signals.

Predictive models 110 effect a degree of feature selection. In various embodiments, predictive models 110 identify high importance features that have the most pronounced impact on predicted value. Different types of model may identify different features as most important. For example, a model based upon a buy-only signal may identify different leading features than a model based upon a lapse-only signal.

TABLE 1

Features from $l_1$ buy-don't-lapse model

| Importance | Feature |
|---|---|
| −2.7125 | expectant_parent_nominal |
| −0.3126 | recent_divorce_nominal_0 |
| −0.2634 | credit_card_new_issue_nominal_0 |
| −0.1438 | gender_input_individual_nominal_0 |
| 0.1117 | socially_influenced_ordinal |
| 0.0890 | home_length_of_residence_interval |
| −0.0757 | likely_investors_nominal_0 |
| −0.0667 | vacation_travel_international_would_enjoy_ordinal_to_binary |
| 0.0637 | total_liquid_investible_assets_fin_ordinal |
| −0.0632 | new_mover_nominal_0 |
| −0.0518 | single_parent_ordinal_to_binary |
| −0.0517 | vacation_travel_time_share_have_taken_ordinal_to_binary |
| −0.0455 | investments_real_estate_ordinal_to_binary |
| 0.0438 | investments_stocks_bonds_ordinal_to_binary |
| 0.0429 | obtain_life_insurance_along_with_loan_mortgage_installment_payments_ordinal |

Table 1 shows the top 15 features from an $l_1$ buy-don't-lapse model. The most important features are identified by the highest absolute value of the importance coefficient. The most important feature of this target is the expectant parent nominal variable, where a 0 corresponds to not expectant. Positive and negative signs of the importance coefficient indicate whether an increases, or a decrease, of the feature increases likelihood of the target. This data indicates that non-expectant parents are less likely to buy, and less likely to lapse.

In an embodiment, in building the predictive model 110, the call center evaluates performance of prospective models, such as test models, for efficacy in predicting buying behavior and/or lapse behavior. In an embodiment, prospective models are tested for the area under the curve (AUC) of a receiver-operator curve (ROC). FIG. 4A is an example 400 of an ROC curve 430. The receiver-operating characteristic (ROC) curve plots the true positive rate (Sensitivity) 410 as a function of the false positive rate (100−Specificity) 420 for different cut-off points. Each point on the ROC curve 430 represents a sensitivity/specificity pair corresponding to a particular decision threshold. An ROC curve with a higher area under the curve (AUC) generally indicates a higher-performing model. The ROC 400 of FIG. 4A was obtained in testing a logistic regression model with $l_1$ regularization on the lapse-only signal, and has an area under the curve (AUC) 440 of 0.574, indicating a high-performing model.

Figure 4B:
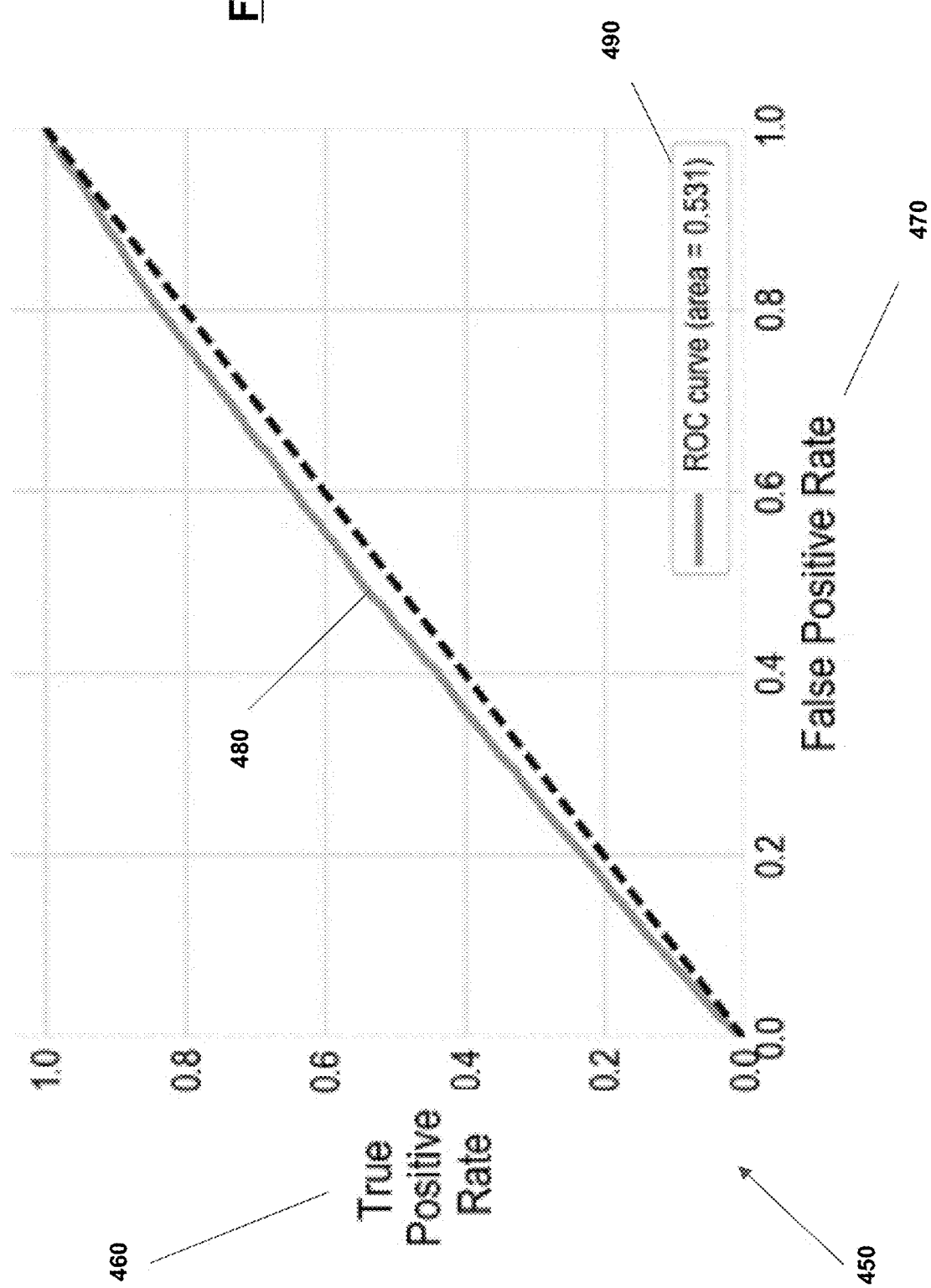
FIG. 4B is a graph of a receiver operator curve (ROC) for a value prediction model, in accordance with an embodiment.

FIG. 4B is another example of another receiver-operator curve (ROC) 450, obtained by testing a logistic regression model with $l_2$ regularization on the buy-only signal trained using all leads. (Sensitivity) 460 as a function of the false positive rate (100−Specificity) 470 for different cut-off points. Each point on the ROC curve 480 represents a sensitivity/specificity pair corresponding to a particular decision threshold. (ROC) 450 has an area under the curve (AUC) 490 of 0.531.

Figure 8:
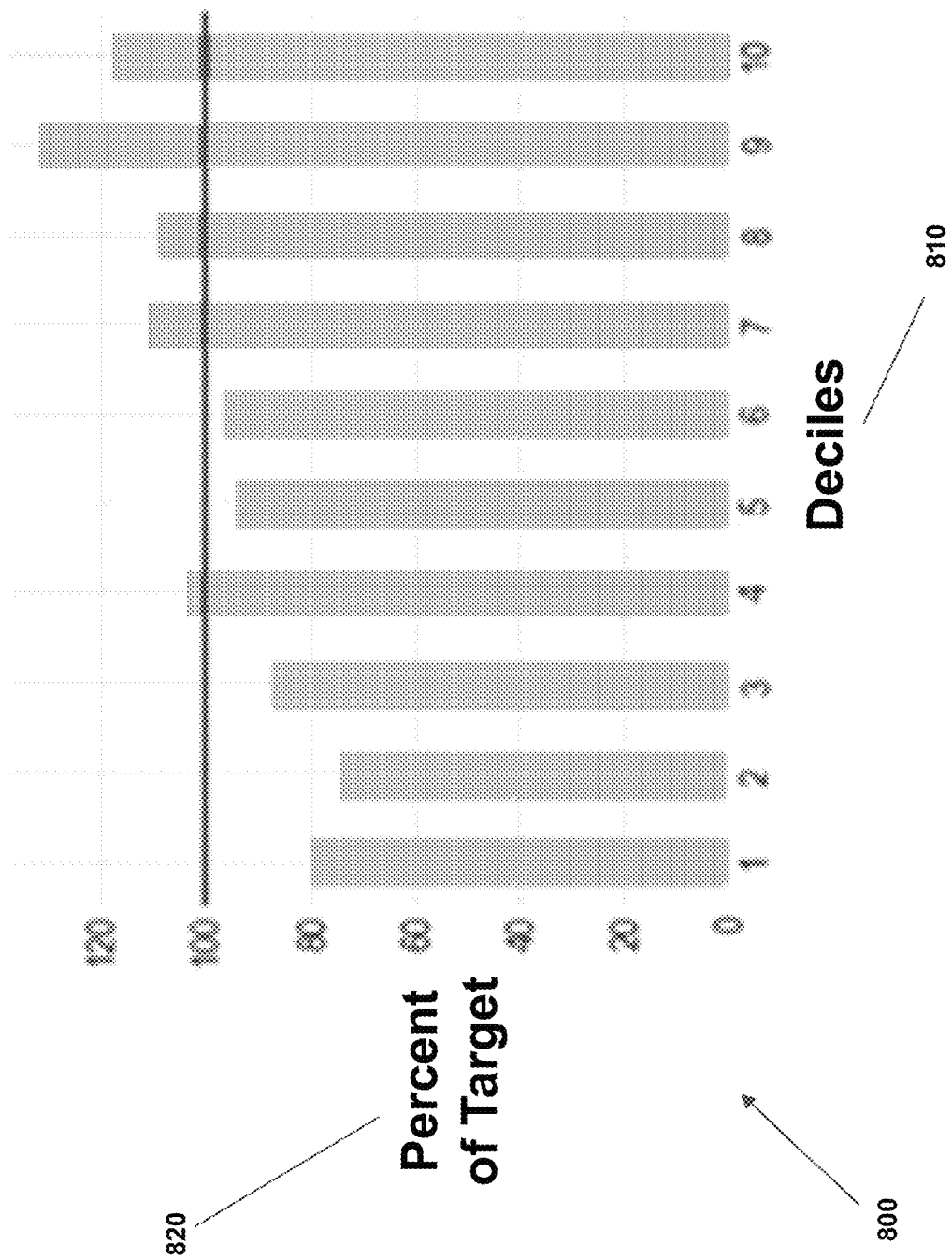
FIG. 8 is a graph of lift across deciles of model scores for a value prediction model, in accordance with an embodiment.

In an embodiment, prospective predictive models are tested for performance by measuring lift across deciles. Lift is a measure of the degree of improvement of a predictive model over analysis without a model. For a binary classifier model, decile lift is applied to deciles of the target records ranked by predicted probability. FIG. 8 is a graph of lift across deciles of model scores 800 for a logistic regression model with $l_1$ regularization on the lapse-only signal, trained on zip-level features. Percent of target values 820 across deciles 810 show a significant impact of the model on lapse rate.

In an embodiment, prospective predictive models are tested for performance by measuring improvements in buying behavior and/or reductions on lapse rate. In various embodiments, these measurements are carried out with different levels of resource constraint of the call center, measured by call center agent resources in view of inbound call volume. For example, a 70% resource constraint involves agent resources at a 70% level of resources in view of call volume relative to full resources.

In illustrative embodiments, the predictive model incorporated a logistic regression model with $l_1$ regularization, for the lapse-only target. In one illustrative embodiment, this model was trained on all customers with individual-level data. In another illustrative embodiment, this model was trained on all customers with zip-level data. At a 70% resource constraint, the model with individual-level data was tested to provide an 11% reduction in lapse rate, while the model with zip-level data was tested to provide an 8% reduction in lapse rate. At a 60% resource constraint, the model with individual-level data was tested to provide a 14% reduction in lapse rate, while the model with zip-level data was tested to provide an 11% reduction in lapse rate.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages or any combination thereof. A code segment or machine-executable instructions may represent a procedure, a function, a subprogram, a program, a routine, a subroutine, a module, a software package, a class or any combination of instructions, data structures or program statements. A code segment may be coupled to another code segment or a hardware circuit by passing and/or receiving information, data, arguments, parameters or memory contents. Information, arguments, parameters, data, etc., may be passed, forwarded or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory, computer-readable or processor-readable storage medium. The steps of a method or algorithm disclosed here may be embodied in a processor-executable software module which may reside on a computer-readable or processor-readable storage medium. A non-transitory, computer-readable or processor-readable media includes both computer storage media and tangible storage media that facilitate transfer of a computer program from one place to another. A non-transitory, processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program product.

I claim:

1. A processor-based method for managing customer calls within a call center, comprising:
   upon receiving a customer call at a call center from an identified customer, retrieving, by a processor, a set of enterprise customer data associated with the identified customer from a customer database that stores the enterprise customer data;
   retrieving, by the processor, customer demographic data associated with the identified customer in the customer call;
   selecting, by the processor, a group of agents from a plurality of groups of agents of the call center wherein the group of agents implements a predetermined customer care interaction, wherein the group of agents is selected based upon consistency of the predetermined customer care interaction with the set of enterprise customer data;
   executing, by the processor, a predictive model to determine a value prediction signal in real time by applying a logistic regression model in conjunction with a tree-based model to the retrieved customer demographic data, wherein the value prediction signal is representative of a likelihood that the identified customer will accept an offer to purchase a product;
   classifying, by the predictive model executing on the processor based on the value prediction signal determined by the predictive model, the identified customer into one of a first value group and a second value group; wherein the first value group comprises customers having a first set of modeled lifetime values, and the second value group comprises customers having a second set of modeled lifetime values, wherein modeled lifetime values in the first set of modeled lifetime values are higher than modeled lifetime values in the second set of modeled lifetime values;
   when the classifying step classifies the identified customer into the first value group, routing, by the processor, the customer call for the identified customer to a priority queue assignment for connection to an agent from the selected group of agents; and
   when the classifying step classifies the identified customer into the second value group, routing, by the processor, the customer call for the identified customer to a subordinate queue assignment.

2. The processor-based method according to claim 1, wherein the priority queue assignment is a relatively favorable queue position in a hold list for callers on hold for connection to an agent from the selected group of agents, and the subordinate queue assignment is a relatively unfavorable queue position in the hold list for callers on hold for connection to an agent from the selected group of agents.

3. The processor-based method according to claim 1, wherein the priority queue assignment is a relatively favorable queue position in a call-back queue for connection to an agent from the selected group of agents, and the subordinate queue assignment is a relatively unfavorable queue position in the call-back queue for connection to an agent from the selected group of agents.

4. The processor-based method according to claim 1, wherein the priority queue assignment is a queue position in a hold list for callers on hold for live connection to an agent from the selected group of agents, and the subordinate queue assignment is a queue position in a call-back queue.

5. The processor-based method according to claim 1, wherein the priority queue assignment is a queue assignment for connection to an agent from the group of agents assigned to implement the predetermined customer care interaction, and the subordinate queue assignment is a queue assignment for connection to an agent from a group of agents assigned to implement a customer care interaction other than the predetermined customer care interaction.

6. The processor-based method according to claim 1, wherein the predetermined customer care interaction is at least one customer care interaction selected from the group consisting of screening leads for prospective customers, closing product sales, cross-selling of products, promoting a given product, and closing sales of a given product.

7. The processor-based method according to claim 1, wherein the predetermined customer care interaction comprises closing product sales, wherein the priority queue assignment is a queue assignment for connection to an agent from a group of agents assigned to close product sales, and the subordinate queue assignment is a queue assignment for connection to an agent from a group of agents assigned to screen leads for prospective customers.

8. The processor-based method according to claim 1, wherein the predetermined customer care interaction comprises cross-selling of products, and the set of enterprise customer data comprises customer event data associated with a purchaser and activity event data indicating likelihood of an additional purchase.

9. The processor-based method according to claim 1, wherein the predetermined customer care interaction comprises closing sales of a given product, and the set of enterprise customer data comprises activity event data indicating customer interest in a marketing campaign for the given product.

10. The processor-based method according to claim 1, wherein the step of selecting the group of agents from the plurality of groups of agents based upon consistency of the predetermined customer care interaction with the set of enterprise customer data comprises selecting the group of agents from three or more groups of agents.

11. The processor-based method according to claim 1, wherein the customer database further stores enterprise customer data associated with new business applicants of the enterprise, wherein the predetermined customer care interaction comprises closing product sales, and the set of enterprise customer data comprises customer event data associated with a new business applicant or attributions data associated with the new business applicant.

12. The processor-based method according to claim 1, wherein the logistic regression model is a logistic regression model with $l_1$ regularization.

13. The processor-based method according to claim 1, wherein the logistic regression model is a logistic regression model with 12 regularization.

14. The processor-based method according to claim 1, wherein the tree-based model is a random forests ensemble learning method for classification.

15. A system for managing customer calls within a call center, comprising:
an inbound telephone call-receiving device for receiving a customer call to the call center;
non-transitory, machine-readable memory that stores a customer database including enterprise customer data associated with an enterprise serviced by the call center; and
a processor configured to execute an inbound queue management module and a predictive modeling module, the predictive modeling module is configured to store a predictive model of customer value, wherein the predictive model comprises a logistic regression model operating in conjunction with a first tree-based model, wherein the processor in communication with the non-transitory machine-readable memory executes a set of instructions instructing the processor to:
upon receiving the customer call at the inbound telephone call-receiving device from an identified customer, retrieve from the customer database a set of the enterprise customer data associated with the identified customer;
retrieve customer demographic data associated with the identified customer;
select a group of agents that implements a predetermined customer care interaction from a plurality of groups of agents of the call center, based upon consistency of the predetermined customer care interaction with the set of enterprise customer data;
determine a value prediction signal for the identified customer via applying the predictive model to the set of the enterprise customer data and the customer demographic data, wherein the value prediction signal is representative of a likelihood that the identified customer will accept an offer to purchase a product;
classify the identified customer into one of a first value group and a second value group based on the value prediction signal determined; wherein the first value group comprises customers having a first set of modeled lifetime values and the second value group comprises customers having a second set of modeled lifetime values, wherein modeled lifetime values in the first set of modeled lifetime values are higher than modeled lifetime values in the second set of modeled lifetime values; and
direct the inbound telephone call receiving device:
when the inbound queue management module classifies the identified customer into the first value group, to route the customer call for the identified customer to a priority queue assignment for connection to an agent from the selected group of agents; and
when the inbound queue management module classifies the identified customer into the second value group, to route the customer call for the identified customer to a subordinate queue assignment.

16. The system according to claim 15, wherein the priority queue assignment is a relatively favorable queue position in a hold list for live connection to an agent from the selected group of agents, and the subordinate queue assignment is a relatively unfavorable queue position in the hold list for live connection to an agent from the selected group of agents.

17. The system according to claim 15, wherein the priority queue assignment is a relatively favorable queue position in a call-back queue for connection to an agent from the selected group of agents, and the subordinate queue assignment is a relatively unfavorable queue position in the call-back queue for connection to an agent from the selected group of agents.

18. The system according to claim 15, wherein the priority queue assignment is a queue position in a hold list for live connection to an agent from the selected group of agents, and the subordinate queue assignment is a queue position in a call-back queue.

19. The system according to claim 15, wherein the priority queue assignment is a queue assignment for connection to an agent from the group of agents assigned to implement the predetermined customer care interaction, and the subordinate queue assignment is a queue assignment for connection to an agent from a group of agents assigned to implement a customer care interaction other than the predetermined customer care interaction.

20. The system according to claim 15, wherein the predetermined customer care interaction is at least one customer care interaction selected from the group consisting of screening leads for prospective customers, closing product sales, cross-selling of products, promoting a given product, and closing sales of a given product.

* * * * *